(12) United States Patent
Chen et al.

(10) Patent No.: US 12,105,910 B2
(45) Date of Patent: Oct. 1, 2024

(54) TOUCH SENSING METHOD AND ELECTRONIC DEVICE

(71) Applicant: NOVATEK MICROELECTRONICS CORP., Hsinchu (TW)

(72) Inventors: Yu-Huang Chen, Tainan (TW); Feng-Lin Chan, Zhubei (TW)

(73) Assignee: NOVATEK MICROELECTRONICS CORP., Hsinchu (TW)

( * ) Notice: Subject to any disclaimer, the term of this patent is extended or adjusted under 35 U.S.C. 154(b) by 0 days.

(21) Appl. No.: 18/122,540

(22) Filed: Mar. 16, 2023

(65) Prior Publication Data

US 2023/0221820 A1 Jul. 13, 2023

Related U.S. Application Data

(63) Continuation-in-part of application No. 17/331,197, filed on May 26, 2021.

(Continued)

(51) Int. Cl.
*G06F 3/041* (2006.01)
*G06F 3/044* (2006.01)

(52) U.S. Cl.
CPC ........ *G06F 3/04166* (2019.05); *G06F 3/0418* (2013.01); *G06F 3/0446* (2019.05)

(58) Field of Classification Search
CPC .. G06F 3/04166; G06F 3/0418; G06F 3/0446; G06F 3/0443
See application file for complete search history.

(56) References Cited

U.S. PATENT DOCUMENTS

| 10,592,055 B2 | 3/2020 | Lee et al. |
| 2010/0060610 A1 | 3/2010 | Wu |

(Continued)

FOREIGN PATENT DOCUMENTS

| CN | 101446721 A | 1/2011 |
| CN | 102053765 A | 5/2011 |

(Continued)

OTHER PUBLICATIONS

U.S. Appl. No. 17/330,058, filed May 26, 2021.
U.S. Office Action for U.S. Appl. No. 17/331,197, dated Jun. 2, 2022.

*Primary Examiner* — Hong Zhou
(74) *Attorney, Agent, or Firm* — MARSHALL, GERSTEIN & BORUN LLP

(57) ABSTRACT

A touch sensing method for a touch panel and an electronic device are provided. The touch panel includes touch sensing units. The touch sensing method includes: in a first sensing period, applying touch excitation signals to a first group of the touch sensing units to obtain first touch sensing signals; applying touch reference signals to a second group of the touch sensing units to obtain a first reference sensing signal; in a second sensing period, applying the touch excitation signals to the second group of the touch sensing units to obtain second touch sensing signals; applying the touch reference signal to the first group of the touch sensing units to obtain a second reference sensing signal; and acquiring capacitance values of the touch sensing units according to the first touch sensing signals, the first reference sensing signal, the second touch sensing signals, and the second reference sensing signal.

18 Claims, 15 Drawing Sheets

Related U.S. Application Data

(60) Provisional application No. 63/063,416, filed on Aug. 9, 2020, provisional application No. 63/030,317, filed on May 27, 2020.

(56) References Cited

U.S. PATENT DOCUMENTS

| | | | |
|---|---|---|---|
| 2013/0093720 A1 | 4/2013 | Liu et al. | |
| 2013/0300690 A1 | 11/2013 | Yang et al. | |
| 2015/0002445 A1 | 1/2015 | Brunet et al. | |
| 2016/0291766 A1 | 10/2016 | Shen et al. | |
| 2017/0205933 A1 | 7/2017 | Kwon et al. | |
| 2018/0307337 A1 | 10/2018 | Ahn | |
| 2019/0050087 A1 | 2/2019 | Chandran et al. | |
| 2019/0079124 A1 | 3/2019 | Jiang et al. | |
| 2019/0385551 A1* | 12/2019 | Kim | G02F 1/13338 |
| 2020/0103993 A1 | 4/2020 | Krah et al. | |
| 2020/0210022 A1* | 7/2020 | Kim | G06F 3/0418 |
| 2021/0255735 A1 | 8/2021 | Gray et al. | |
| 2022/0057898 A1* | 2/2022 | Lee | H10K 59/40 |

FOREIGN PATENT DOCUMENTS

| | | |
|---|---|---|
| CN | 101937662 A | 11/2014 |
| CN | 104182099 A | 12/2014 |
| CN | 104769536 A | 7/2015 |
| CN | 104834406 A | 8/2015 |
| CN | 102650917 A | 12/2015 |
| CN | 108874205 A | 11/2018 |
| CN | 108874210 A | 11/2018 |
| CN | 109144305 A | 1/2019 |
| CN | 106990873 A | 6/2019 |
| CN | 110096181 A | 8/2019 |
| CN | 110389678 A | 10/2019 |
| CN | 110609636 A | 12/2019 |

* cited by examiner

400

S401 — in a first sensing period,
applying a plurality of touch excitation signals to a first group of the touch sensing units to obtain a plurality of first touch sensing signals;
applying at least one touch reference signal to at least one of a second group of the touch sensing units to obtain at least one first reference sensing signal S402 — in a second sensing period,
applying the plurality of touch excitation signals to the second group of the touch sensing units to obtain a plurality of second touch sensing signals;
applying the at least one touch reference signal to at least one of the first group of the touch sensing units to obtain at least one second reference sensing signal S403 — acquiring a plurality of capacitance values of the plurality of touch sensing units according to the plurality of first touch sensing signals, the at least one first reference sensing signal, the plurality of second touch sensing signals and the at least one second reference sensing signal

Fig. 4A

TOUCH SENSING METHOD AND ELECTRONIC DEVICE

CROSS-REFERENCE TO RELATED APPLICATIONS

This application is a continuation-in-part application of U.S. non-Provisional application Ser. No. 17/331,197 entitled "touch sensing method and electronic device" and filed on May 26, 2021, which claims the priority of U.S. Provisional Application No. 63/030,317 entitled "touch detection circuit and operating method thereof" and filed on May 27, 2020, U.S. Provisional Application No. 63/063,416 entitled "differential sensing technology applied to touch circuit" and filed on Aug. 9, 2020, which are incorporated into this disclosure by reference in their entirety.

TECHNICAL FIELD

The present disclosure relates to a field of circuits, and more specifically, to a touch sensing method and a touch sensing apparatus for a touch panel, and an electronic device.

BACKGROUND

For traditional panels that integrate touching, displaying or fingerprint-recognizing, interference between respective circuits used to drive touch sensing (touching), displaying, or fingerprint-recognizing cannot be avoided, which affects the effect of touch sensing. A traditional solution may be, for example, time-division driving of respective circuits used for driving touching, displaying, or fingerprint recognizing, to avoid interference with each other. However, for integrated panels that integrate display panels like organic light-emitting diodes (OLEDs)/or Mini LEDs, etc., since the display driving cannot be stopped, it is difficult to achieve time-division driving. That is to say, operations on a display panel may always bring noises to the touch sensing. Or, it is currently possible to use analog or digital filters in touch sensing circuits to increase sampling time. However, this method requires more power consumption.

Therefore, there is a need for a solution that may reduce the influence of noise caused by displaying and fingerprint recognizing as well as other operations on the touch sensing of the touch panel.

SUMMARY OF THE DISCLOSURE

According to an aspect of the present disclosure, there is provided a touch sensing method for a touch panel, the touch panel including a plurality of touch sensing units, the touch sensing method including: in a first sensing period, applying a plurality of touch excitation signals to a first group of the touch sensing units to obtain a plurality of first touch sensing signals; applying at least one touch reference signal to at least one of a second group of the touch sensing units to obtain at least one first reference sensing signal; in a second sensing period, applying the plurality of touch excitation signals to the second group of the touch sensing units to obtain a plurality of second touch sensing signals; applying the at least one touch reference signal to at least one of the first group of the touch sensing units to obtain at least one second reference sensing signal; and acquiring a plurality of capacitance values of the plurality of touch sensing units according to the plurality first touch sensing signals, the at least one first reference sensing signal, the plurality of second touch sensing signals and the at least one second reference sensing signal.

According to an aspect of the present disclosure, there is provided a touch sensing method for a touch panel, the touch panel including a plurality of touch sensing units, and the touch sensing method includes: selecting a portion of the plurality of touch sensing units as a plurality of to-sense touch sensing units, applying first touch excitation signals to the plurality of to-sense touch sensing units to obtain a plurality of first touch sensing signals, and obtaining a plurality of differential sensing signals from the plurality of first touch sensing signals; selecting at least one of the plurality of touch sensing units as a reference touch sensing unit, and applying a touch reference signal to the reference touch sensing unit to obtain at least one reference sensing signal; selecting at least one of the plurality of to-sense touch sensing units as a preprocessing touch sensing unit, and applying a second touch excitation signal to the preprocessing touch sensing unit to obtain at least one second touch sensing signal; obtaining at least one capacitance sensing signal from the at least one reference sensing signal and the at least one second touch sensing signal; and acquiring capacitance values of the plurality of to-sense touch sensing units according to the plurality of differential sensing signals and the at least one capacitance sensing signal.

According to another aspect of the present disclosure, there is further provided a touch sensing method for a touch panel, the touch panel including a plurality of touch sensing units, and the touch sensing method includes: selecting a portion of the plurality of touch sensing units as a plurality of to-sense touch sensing units and selecting at least one of the plurality of touch sensing units as a reference touch sensing unit; applying touch excitation signals to the plurality of to-sense touch sensing units to obtain a plurality of first touch sensing signals, and applying a touch reference signal to at least one reference touch sensing unit to obtain at least one reference sensing signal; obtaining a plurality of differential sensing signals from the plurality of first touch sensing signals; selecting at least one of the plurality of first touch sensing signals as at least one second touch sensing signal; obtaining at least one capacitance sensing signal from the at least one second touch sensing signal and the at least one reference sensing signal; and acquiring capacitance values of the plurality of touch sensing units according to the plurality of differential sensing signals and the at least one capacitance sensing signal.

According to yet another aspect of the present disclosure, there is further provided an electronic device comprising: a touch panel, a touch sensing apparatus configured to perform touch sensing methods described above, and a controller configured to determine a touch position based on capacitance values of the plurality of to-sense touch sensing units.

In order to make the features and advantages of the present disclosure as described above more comprehensible, embodiments are listed below and are described in detail with reference to the accompanying drawings.

BRIEF DESCRIPTION OF THE DRAWINGS

The accompanying drawings are used to provide a further understanding of embodiments of the present disclosure, and constitute a part of the specification, and are used to explain the present disclosure together with the embodiments of the present disclosure, and do not constitute a limitation to the present disclosure. Throughout the accompanying drawings, the same reference numerals generally represent the same/similar components or steps.

FIG. 4A shows a schematic flowchart of a touch sensing method 400 for a touch panel according to an embodiment of the present disclosure.

DESCRIPTION OF THE EMBODIMENTS

Figure 1:
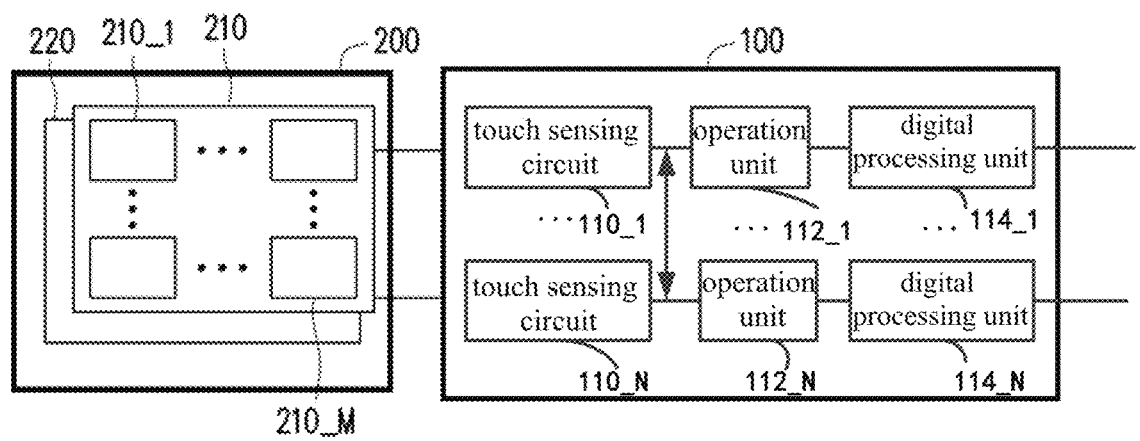
FIG. 1 shows a schematic diagram of a touch sensing apparatus and a touch-and-display panel according to one embodiment of the present disclosure.

The term "coupled (or connected)" used in the full specification of this disclosure (including the claims) may refer to any direct or indirect connection means. For example, if it is described in the specification that a first device is coupled (or connected) to a second device, it should be interpreted as that the first device may be directly connected to the second device, or the first device may be indirectly connected to the second device through another device or some kind of connection means. The terms "first" and "second" and so on mentioned in the full specification of this disclosure (including the claims) are used to name the element (element), or to distinguish different embodiments or scopes, and are not used to limit the upper or lower limit of the number of elements, nor are not used to limit the order of the elements. In addition, wherever possible, elements/members/steps with the same reference signs in the accompanying drawings and implementations represent the same or similar parts. Elements/members/steps using the same reference numerals or using the same terms in different embodiments may mutually refer to relevant descriptions. An expression used in the singular may encompass the expression of the plural, and an expression used in the plural may also encompass the expression of the singular unless it has been clearly defined in the context.

FIG. 1 is a schematic diagram of a touch sensing apparatus and a touch-and-display panel according to one embodiment of the present disclosure.

Referring to FIG. 1, a touch sensing apparatus 100 is coupled to a touch-and-display panel 200, and the touch-and-display panel 200 is integrated with a touch panel 210 and a display panel 220. The touch panel 210 includes a plurality of touch sensing units 210_1~210_M, where M is a positive integer. Touch sensing units have the same semantics as touch sensitive cells or touch-sensitive units, and the three can be used interchangeably.

According to some embodiments, the touch sensing units 210_1~210_M may be arranged to overlap the display panel 220 on at least one surface of the display panel 220, as shown in FIG. 1. In some embodiments, the touch sensing units 210_1~210_M may be formed inside the display panel 220.

In the embodiments of the present disclosure, the touch sensing apparatus 100 is suitable for sensing the plurality of touch sensing units 210_1~210_M of the touch-and-display panel 210.

The touch sensing units 210_1~210_M may be touch electrodes. Each touch electrode forms a self-capacitor relative to a reference ground. When a touch excitation signal is applied to the touch electrode, an electrical signal is output from the touch electrode. When a touch occurs and a touch excitation signal is applied to the touch electrode, additional capacitors will be introduced, thereby causing a change in the electrical signal output by the touch electrode. The change in the electrical signal may be used to detect that touch is occurring at the touch electrode.

The plurality of touch sensing units 210_1~210_M may be arranged according to the shape of the panel. In some embodiments, the plurality of touch sensing units 210_1~210_M may be arranged in an A*B (A row(s) and B column(s)) array form, which is not limited in this disclosure.

Although it is shown in FIG. 1 that the touch sensing unit is of the type of self-capacitance, and most of the description in the context of the present disclosure is based on the type of self-capacitance, those skilled in the art will understand that the touch sensing unit may also be of the type of mutual capacitance. In the case of the type of mutual capacitance, the touch panel 210 includes touch electrodes (driving electrodes and sensing electrodes) arranged in rows and columns, and there is one mutual capacitor at an intersection of each row and each column, and the mutual capacitor may be considered as one touch sensing unit. Each driving electrode is applied with a driving signal, and the sensing signals corresponding to the driving signal are read from all the sensing electrodes. When a touch occurs, the mutual capacitance values of the touch electrodes near the touch position will change, which will cause the value of the sensing signal to change, so that it can be determined that the touch occurs.

The touch sensing apparatus 100 may include a plurality of touch sensing circuits, denoted by 110_1~110_N. One touch sensing circuit may be arranged for each touch sensing unit. It is determined that the touch is occurring in the touch sensing unit based on the change of the electrical signal obtained from the touch sensing unit, and the number of the touch sensing circuit should be M (that is, A*B). In some embodiments, one touch sensing circuit may be arranged for each row, and one touch sensing circuit may be configured for each column, that is, a plurality of sensing channels are configured horizontally and vertically, and each sensing channel is configured with one touch sensing circuit. In this case, it is necessary to detect the horizontal and vertical channels to determine the position of the touch sensing unit where the touch occurs, based on the row and column where the electrical signal changes are detected, and the number of touch sensing circuits should be A+B. In addition, in the case that touch sensing unit may also be of the type of mutual capacitance, one or more circuits that apply the excitation signal (or refer as driving signal) to each driving electrode and obtain a plurality of sensing signals from the plurality of sensing electrodes may be collectively regarded as the touch sensing circuit corresponding to the driving electrode.

The touch sensing apparatus 100 may further include a plurality of operation units 112_1~112_N and a plurality of digital processing units 114_1~114_N (for example, an analog-to-digital converter (ADC) and a digital back-end (DBE) circuit, the digital back-end circuit includes a digital processing circuit with related specific functions, and the DBE circuit may also be omitted, which is not limited in this disclosure), etc., which correspond to the plurality of touch sensing circuits 110_1~110_N in an one-to-one manner, where N is a positive integer. Each of the touch sensing circuits 110_1~110_N may obtain a sensing signal from a touch sensing unit, and provide the obtained sensing signal to the subsequent operation unit and digital processing unit, etc., so as to output a digital signal. The paths between the touch sensing circuits 110_1~110_N to the operation units 112_1~112_N may provide signals to each other to perform respective signal operations. The subsequent controller may determine the touch position according to the respective signals provided by the digital processing units.

In this embodiment, the operation units 112_1~112_N may implement operation mode in the form of current, voltage or electric charge, to implement the operation functions described in the embodiments of the present disclosure.

It should be noted that the "noise" mentioned above or below in the present disclosure may include interference from the display panel received by the touch panel, such as cathode noise and common mode noise from the display panel 220 or other noise, which is not limited in this disclosure. In one embodiment, the display panel may be, for example, an Organic Light-Emitting Diode (OLED) display panel, a Liquid-Crystal Display (LCD) panel, a mini-led or other types of display panels, which is not limited in this disclosure. In addition, the touch sensing circuit may also be integrated in an integrated chip with a display driver, such as a Touch and Display Driver Integration (TDDI) chip. In addition, in another embodiment, the touch-and-display panel may also be integrated with a fingerprint recognizing panel, so that the "noise" in the present disclosure is more likely to include interference from the fingerprint recognizing panel. In addition, the touch sensing circuit is also integrated in an integrated chip having a fingerprint sensing driver and a display driver, such as a Fingerprint, Touch and Display driver Integration (FTDI) chip.

Figure 2:
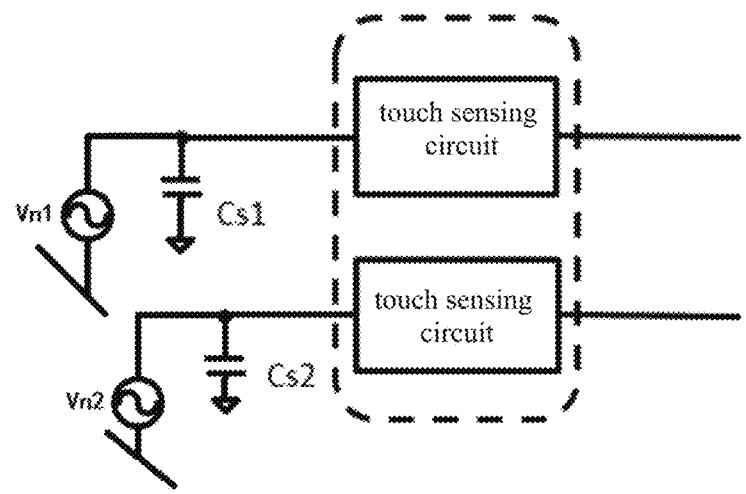
FIG. 2 shows a schematic diagram of the influence of noise signals on touch sensing units according to one embodiment of the present disclosure.

In the embodiments of the present disclosure, taking self-capacitance as an example, for each touch sensing unit, in a case that an area of a contact pad of the touch electrode corresponding to the touch sensing unit is the same, based on a formation principle of parallel plate capacitor, it may be known that when a horizontal position of the touch electrode is fixed, the self-capacitance of the touch electrode is proportional to the area of the contact pad, so it is default that external interferences (for example, display noise, common mode noise, etc.) they are subject to are the same. At this time, a schematic diagram of the influence of noise signals on the touch sensing units may be as shown in FIG. 2. Of course, if the areas of the contact pads of the touch electrodes corresponding to the touch sensing units are different, correspondingly, the external interference (for example, display noise, common mode noise, etc.) subjected by these touch sensing units may be different.

In FIG. 2, two touch sensing units and corresponding two touch sensing circuits are shown. The first touch sensing unit has a self-capacitance Cs1 and the second touch sensing unit has a self-capacitance Cs2. In a case shown in FIG. 2, the areas of the contact pads of the touch electrodes corresponding to the touch sensing units are the same. Since a size of the self-capacitance may be determined by the area of the contact pad of the touch electrode corresponding to the touch sensing unit, the self-capacitances Cs1 and Cs2 of each touch sensing unit are equal, and voltage Vn1 and Vn2 of the noise signals are respectively applied to the self-capacitance Cs1 and Cs2 of each touch sensing unit. In addition, generally for a same touch panel, the voltage Vn1 or Vn2 of the noise signal subjected by each touch electrode is also positively correlated with the area of the contact pad of the touch electrode.

Similarly, when the touch sensing unit is of the type of mutual capacitance, the mutual capacitance value will also be determined by the relative area of the touch electrode (the driving electrode and the sensing electrode). For example, the mutual capacitance value of the mutual capacitor between the driving electrode in the first row and the sensing electrode in the first column is determined by the relative area of the two electrodes. In addition, the value of the voltage of the noise signal applied to the mutual capacitor is also positively correlated with the relative area.

The touch sensing method for the touch panel proposed by the embodiments of the present disclosure is able to reduce the influence of noises on the touch sensing result.

Hereinafter, the touch sensing method for the touch panel according to an embodiment of the present disclosure will be described in detail with reference to FIGS. 3A-3F.

Figure 3A:
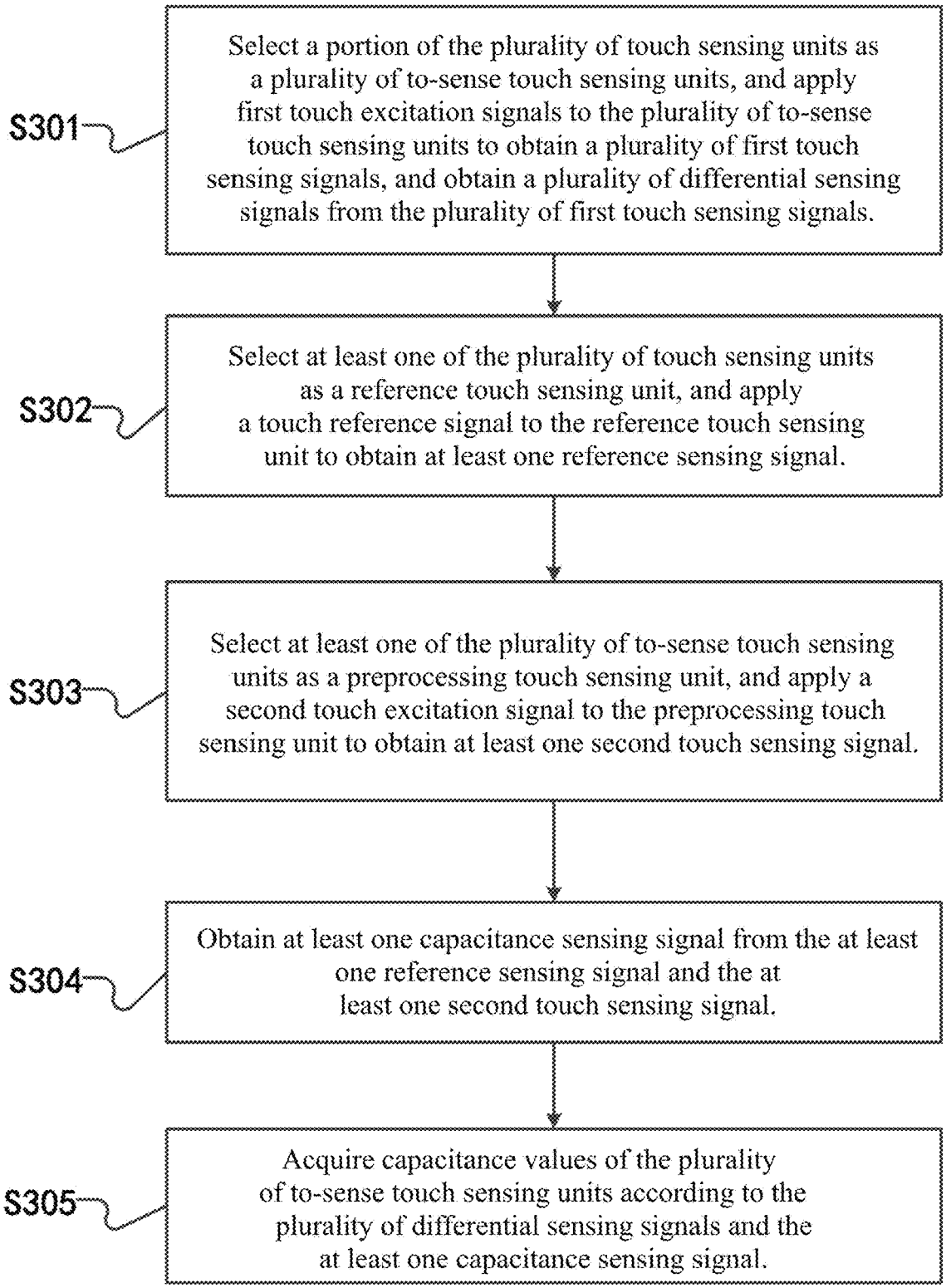
FIGS. 3A-3B show schematic flowcharts of a touch sensing method for a touch panel according to an embodiment of the present disclosure.

FIG. 3A shows a schematic flowchart of a touch sensing method 300 for a touch panel according to an embodiment of the present disclosure. This touch sensing method may be used in touch sensing circuits and operation units shown in FIG. 1. In method 300, the touch sensing unit to be sensed (hereinafter, also referred to as "to-sense touch sensing unit" for brevity) and the reference touch sensing unit work in a time-division manner.

As shown in FIG. 3A, at step S301, a portion of the plurality of touch sensing units are selected as a plurality of to-sense touch sensing units, and first touch excitation signals are applied to the plurality of to-sense touch sensing units to obtain a plurality of first touch sensing signals, and a plurality of differential sensing signals are obtained from the plurality of first touch sensing signals. At step S302, at least one of the plurality of touch sensing units is selected as a reference touch sensing unit, and a touch reference signal is applied to the reference touch sensing unit to obtain at least one reference sensing signal. At step S303, at least one to-sense touch sensing unit is selected from the plurality of to-sense touch sensing units as a preprocessing touch sensing unit, and a second touch excitation signal is applied to the preprocessing touch sensing unit to obtain at least one second touch sensing signal. At step S304, at least one capacitance sensing signal is obtained from the at least one reference sensing signal and the at least one second touch sensing signal. At step S305, according to the plurality of differential sensing signals and the at least one capacitance sensing signal, the capacitance values of the plurality of to-sense touch sensing units are obtained.

The above steps are further described below with reference to FIGS. 3B to 3F. Optionally, as shown in FIG. 1, each touch sensing circuit has a corresponding touch sensing unit. In the case that touch occurs on the touch sensing unit is sensed, this touch-sensing circuit outputs a touch signal. For example, when a user's finger or pen touches or approaches the touch sensing unit, the touch sensing circuit may detect the capacitance change at the touch sensing unit, so that the touch sensing circuit may output a touch sensing signal indicating the change to the subsequent corresponding operation unit.

Optionally, at step S301, a plurality of touch sensing circuits may apply first touch excitation signals to a plurality of to-sense touch sensing units in a first time period. The following illustration takes the first touch excitation signals being applied by the plurality of touch sensing circuits to the plurality of to-sense touch sensing units in the first time period as an example, and those skilled in the art should understand that this disclosure is not limited thereto.

Figure 3B:
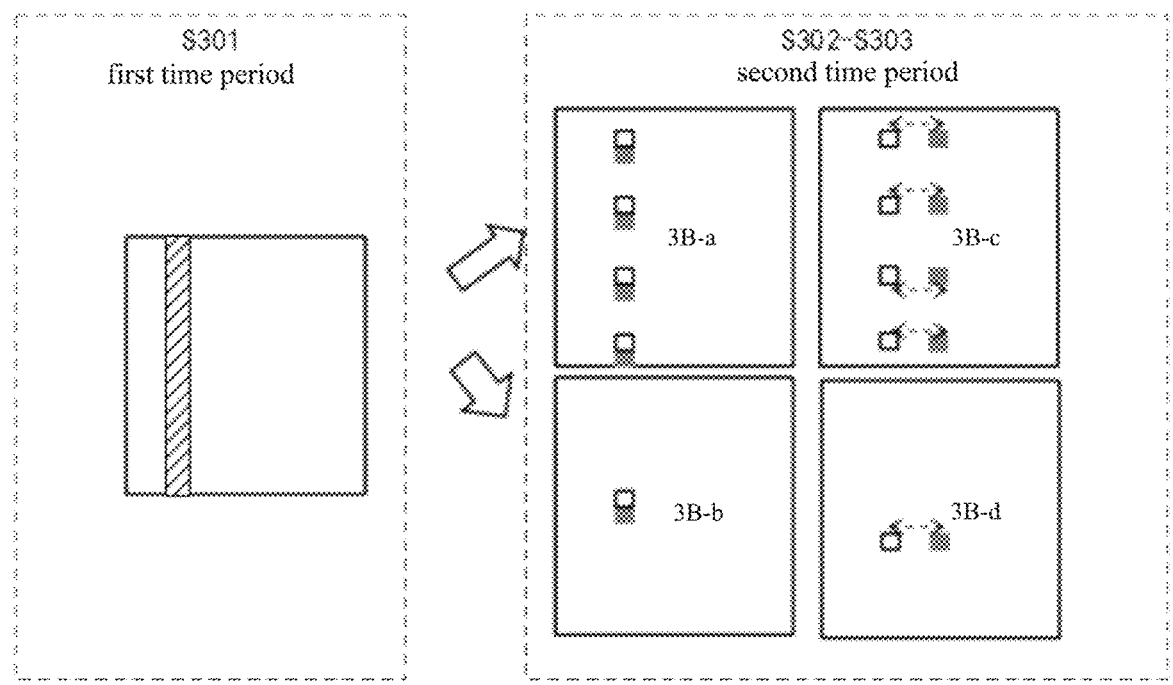

Optionally, the plurality of touch sensing units may be a plurality of touch sensing units arranged in a matrix. For example, referring to FIG. 3B, at step S301, the selection of a portion of the plurality of touch sensing units as a plurality of to-sense touch sensing units further includes: selecting touch sensing units located in the same column from the plurality of touch sensing units as a plurality of to-sense touch sensing units. Those skilled in the art should understand that FIG. 3B is only an example, and the to-sense touch sensing unit may be selected in alternative ways, which is not limited in this disclosure. In FIG. 3B, the column filled with diagonal lines shows the touch sensing units of the same column. Optionally, each touch sensing unit in the column is selected as a to-sense touch sensing unit in the first time period. In the first time period, each touch sensing unit in the column is applied with a first touch excitation signal. In this column, a first touch sensing signal corresponding to every two touch sensing units may yield one differential sensing signal. Hereinafter, with reference to FIG. 3C, how to yield a differential sensing signal according to the first touch sensing signal will be described.

Figure 3C:
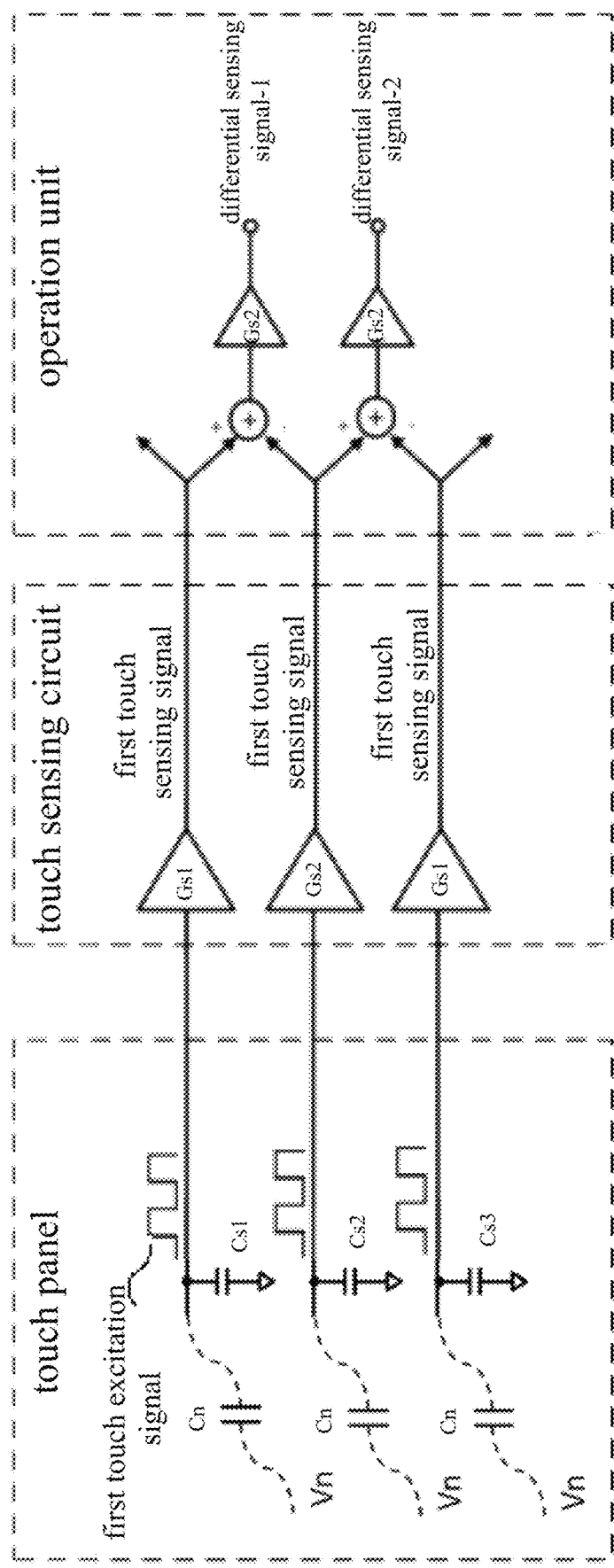
FIG. 3C shows an equivalent circuit for applying excitation signals to three to-sense touch sensing units in a first time period according to an embodiment of the present disclosure.
Figure 3D:
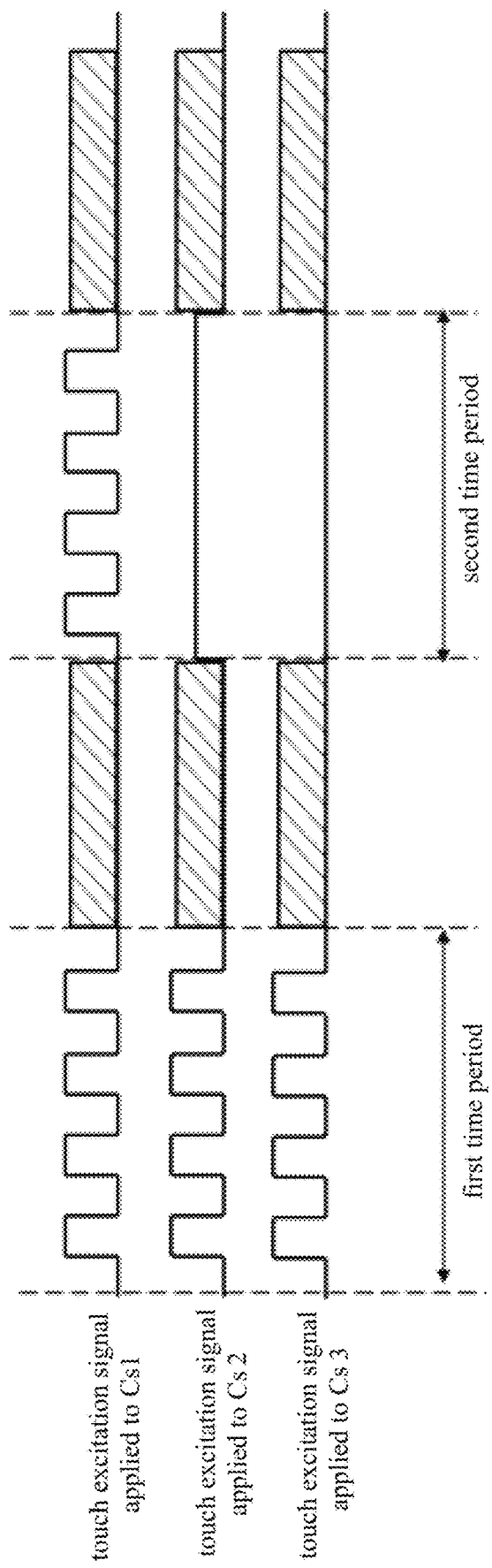
FIG. 3D shows a timing chart when touch sensing is performed on three to-sense touch sensing units according to an embodiment of the present disclosure.

FIG. 3C shows an equivalent circuit for applying excitation signals to three to-sense touch sensing units in a first time period according to an embodiment of the present disclosure. FIG. 3D shows a timing chart when touch sensing is performed on three to-sense touch sensing units according to an embodiment of the present disclosure. FIGS. 3C and 3D are only examples to facilitate illustration, and those skilled in the art should understand that the touch panel may include more or less touch sensing units, and their timing may also be set correspondingly, which is not limited in this disclosure.

Referring to FIGS. 3C and 3D, as an example, Cs1, Cs2, and Cs3 represent equivalent capacitances of touch sensing units (hereinafter also referred to as capacitances to be measured) on different sensing lines of the touch panel. Optionally, each touch sensing circuit corresponding to Cs1, Cs2, and Cs3 includes a first operational amplifier Gs1. Each touch sensing circuit may apply an excitation signal (e.g., a first touch excitation signal, a reference sensing signal, a second touch excitation signal) to a corresponding sensing line of the touch panel, and detect the capacitance values of these touch sensing units. That is, the operation of touch sensing on the touch panel may be performed by the touch sensing circuit. The excitation signal may be an Alternating Current (AC) voltage.

In a case where the touch sensing unit is of the type of self-capacitance, as shown in FIG. 3D, in the process of touch sensing, the touch sensing circuit applies touch excitation signals to Cs1, Cs2, and Cs3, respectively. Among them, in a first time period, the touch excitation signals applied to Cs1, Cs2 and Cs3 may also be called the first touch sensing signals. In a second time period, the touch excitation signal applied to Cs1 may also be called a second touch sensing signal. In a second time period, the touch excitation signal applied to Cs2 may also be called a touch reference signal.

Optionally, in FIG. 3D, the time period identified by diagonal squares may be a time period for non-touch sensing. The time period for non-touch sensing may be, for example, a display time period or a time period for fingerprint sensing and recognition, or an arbitrary blank time period. In the time period for non-touch sensing, the touch sensing circuit does not work, and the touch sensing unit does not work either. As an example, no excitation signal may be applied to the touch sensing unit during this time period. As another example, a direct current signal may be applied to the touch sensing unit during this time period so that the touch sensing line does not interfere with the display driving line or the fingerprint sensing line. As another example, an anti-loading driving signal may be applied to the touch sensing unit during this time period to further reduce interference on various circuits integrated into the touch panel. An example of applying the anti-loading driving signal will be further illustrated with reference to FIG. 6. It will not be repeated here in this disclosure.

As one example, the first touch excitation signal and the second touch excitation signal are shown in the form of a square wave in FIGS. 3C and 3D, and those skilled in the art should understand that the first touch excitation signal and the second touch excitation signal may also be AC (alternating current) signals of other waveforms (e.g., sine wave, cosine wave, triangle wave, step wave, etc.). The present disclosure also does not limit the signal amplitude of the first touch excitation signal, which may be adaptively set according to the touch panel.

As shown in FIG. 3C, the touch sensing circuit may acquire a sensing signal, as a first touch sensing signal, from a corresponding touch sensing unit to be sensed. Each touch sensing circuit may be electrically connected with two operation units. Each operation unit includes an adder (or subtractor) and a second operational amplifier (GS2). Optionally, at step S301, each operation unit obtains differential sensing signals (e.g., differential sensing signal-1 and differential sensing signal-2) from two first touch sensing signals, and therefore each differential sensing signal is associated with the difference of capacitance values corresponding to two of the plurality of to-sense touch sensing units.

In some embodiments, the sensing lines in the touch panel are arranged close to some noise sources (such as the common electrode of the touch panel) that provide common-mode noise Vn. Parasitic capacitance Cn is formed between the noise source and these sensing lines, and the common-mode noise Vn will affect the voltage level of these sensing lines of the touch panel with the parasitic capacitance Cn. Therefore, the operation of touch sensing by the touch sensing circuit may often be affected by the common-mode noise Vn. Optionally, the plurality of operation units include a first operation unit (for example, the first operation unit from top to bottom in FIG. 3C) and a second operation unit (for example, the second operation unit from top to bottom in FIG. 3C). The input signals of the first operation unit and the second operation unit have a common first touch sensing signal (for example, a first touch sensing signal corresponding to Cs2). Therefore, through the operation unit, the outputs of the first amplifiers Gs1 of two adjacent sensing lines may be subtracted to yield one differential sensing signal from which the common mode noise component is removed.

With continued reference to FIG. 3C, the first second operational amplifiers Gs2 output a differential sensing signal-1, the voltage of which may be represented by "Vo1". Wherein, Vo1 may be calculated by the formula (1) as follows.

$$Vo1 = Gs2 * [Gs1 * (Vtx * Cs1 + Vn * Cn) - Gs1 * (Vtx * Cs2 + Vn * Cn)] \quad (1)$$
$$= Gs1 * Gs2 * [(Vtx * Cs1 + Vn * Cn) - (Vtx * Cs2 + Vn * Cn)]$$
$$= Vtx * Gs1 * Gs2 * (Cs1 - Cs2)$$

Wherein Vtx represents the voltage of the first touch excitation signal, and for convenience of expression, Gs1 also represents the gain of the first operational amplifier Gs1, and Gs2 also represents the gain of the second operational amplifier Gs2.

In the same way, the second operational amplifier Gs2 outputs a differential sensing signal-2, the voltage of which may be represented by "Vo2". Wherein, Vo2=Vtx*Gs1*Gs2*(Cs2–Cs3). It can be seen that the component of common-mode noise Vn is removed.

After step S301, the "difference" between the capacitances corresponding to the plurality of to-sense touch sensing units may be obtained. For example, "Vo1" is information representing "difference between capacitances Cs1 and Cs2 corresponding to the to-sense touch sensing units", while "Vo2" is information representing "difference between capacitances Cs2 and Cs3 corresponding to to-sense touch sensing units".

Although FIGS. 3B to 3D take self-capacitance as an example for illustration, it should be understood by those skilled in the art that the present disclosure may also be applied to mutual capacitance. For example, in the case where the touch sensing unit is of the type of mutual capacitance, a touch excitation signal may be applied to each driving electrode, and a plurality of sensing signals may be obtained from a plurality of sensing electrodes. In this case, the touch sensing circuit may be divided into two parts: a sub-circuit for applying excitation signal and a sub-circuit for touch detection. Furthermore, the respective driving electrodes of all touch sensing units in one row may be shared, and the respective sub-circuits for applying excitation signal may also be shared. Multiple sensing signals may be obtained from different sensing electrodes through different touch detection sub-circuits. For example, when applying an excitation signal to a row of driving electrodes, a plurality of touch sensing signals corresponding to the excitation signal may be obtained from all sensing electrodes, and these touch sensing signals may be used as first touch sensing signals. Similar to self-capacitance, a plurality of differential sensing signals may also be obtained from a plurality of first touch sensing signals, which will not be repeated here in this disclosure.

Figure 3E:
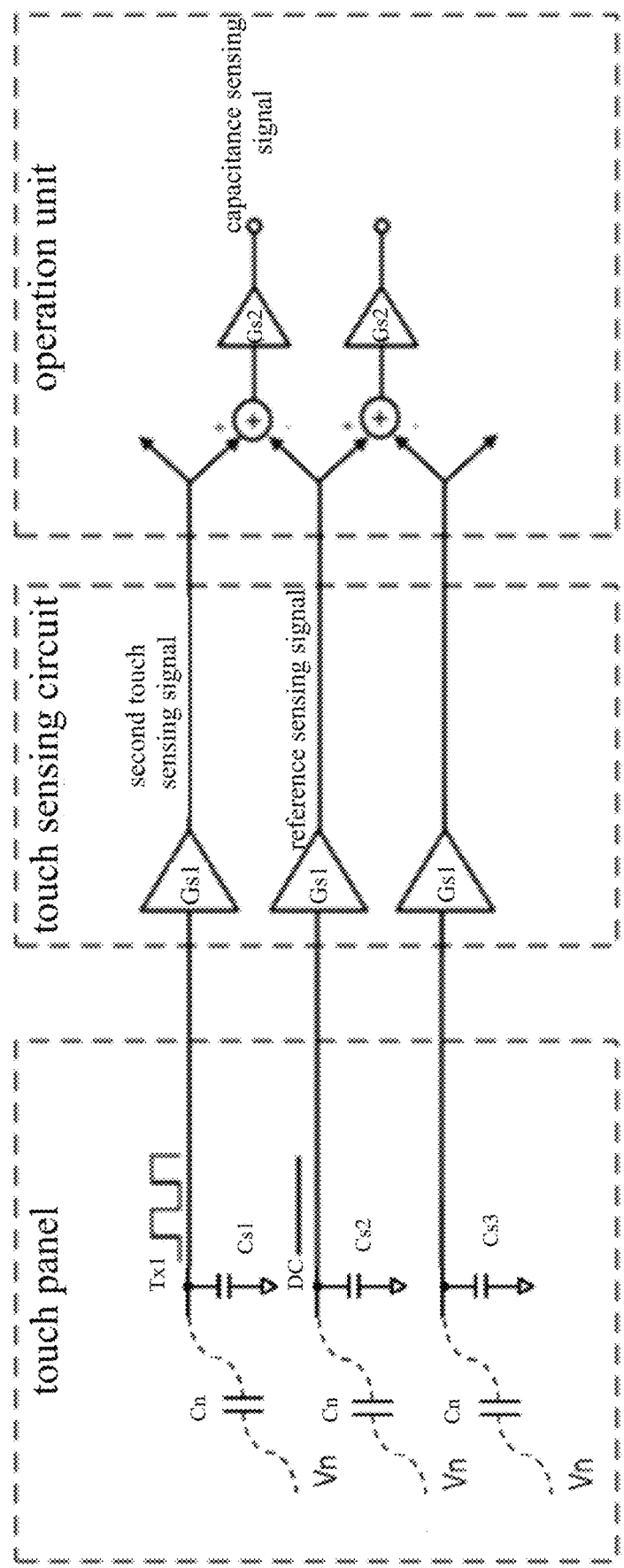
FIGS. 3E-3F show two equivalent circuits for applying excitation signals to a pair of a reference touch sensing unit and a preprocessing touch sensing unit in a second time period according to an embodiment of the present disclosure.
Figure 3F:
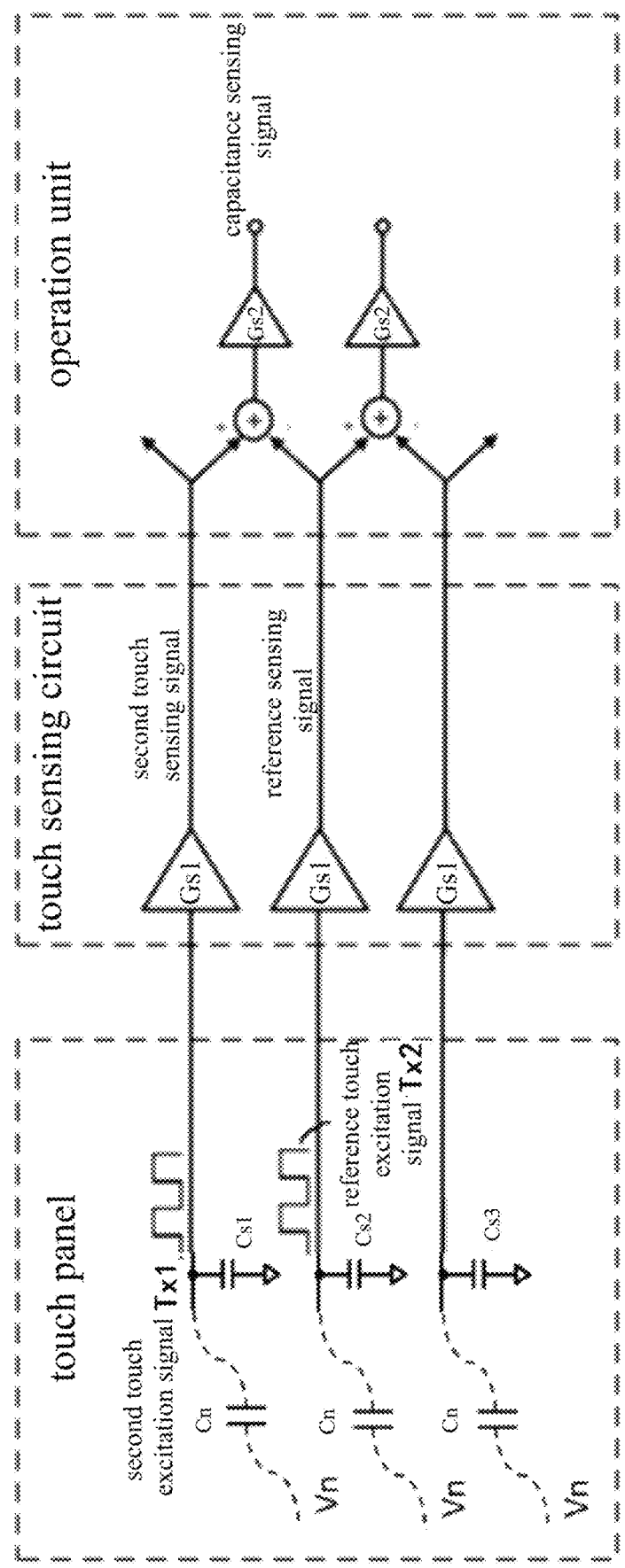

Optionally, referring to FIGS. 3B, 3D to 3F, at step S302 and step S304, in a second time period, the second touch excitation signal is applied to the preprocessing touch sensing unit and the touch reference signal is applied to the reference touch sensing unit. The first time period does not overlap with the second time period. Among them, FIGS. 3E to 3F show equivalent circuits for applying excitation signals to a pair of a reference touch sensing unit and a preprocessing touch sensing unit in a second time period, according to an embodiment of the present disclosure. The following illustration takes a second touch excitation signal being applied by a plurality of touch sensing circuits to the preprocessing touch sensing unit and a touch reference signal being applied to the reference touch sensing unit in the second time period as an example, and those skilled in the art should understand that this disclosure is not limited thereto.

Optionally, the second touch excitation signal may be a variable signal (for example, a signal with variable frequency or amplitude), and the touch reference signal may be a direct current signal or another variable signal. Optionally, the touch sensing circuit may also correspond to one or more reference touch sensing units. Optionally, the touch reference signal and the second touch excitation signal have the same signal waveform. Optionally, the signal waveforms of the touch reference signal and the second touch excitation signal may be different. Optionally, the touch reference signal may be a direct current signal. In addition, when the touch reference signal is a direct current signal, the present disclosure does not limit the amplitude of the touch reference signal.

With continued reference to FIG. 3B, it shows four ways of selecting the reference touch sensing unit and the preprocessing touch sensing unit (shown by reference numerals 3B-a to 3B-d). Wherein, in the second time period, the reference touch sensing units are shown in gray squares, and the preprocessing touch sensing units are shown in white squares. Those skilled in the art should understand that modes 3B-a to 3B-d are only examples, and the reference touch sensing unit and the preprocessing touch sensing unit may be selected in other ways, which is not limited in the present disclosure. Among them, the preprocessing touch sensing unit identified by the white square is one of a plurality of to-sense touch sensing units identified by the column filled with diagonal lines in the first time period.

Mode 3B-a and mode 3B-b show two examples in which the reference touch sensing unit is in the same column as the touch sensing unit to be sensed. In this case, optionally, the selection of at least one of the plurality of touch sensing units as a reference touch sensing unit further includes: selecting at least one touch sensing unit located in the same column as the plurality of to-sense touch sensing units from the plurality of touch sensing units as a reference touch sensing unit. Optionally, in this case, the selection of at least one of the plurality of to-sense touch sensing units as a preprocessing touch sensing unit further includes: selecting at least one to-sense touch sensing units in a different row from the at least one reference touch sensing unit from the plurality of to-sense touch sensing units as the preprocessing touch sensing unit. As shown in mode 3B-a and mode 3B-b, the reference touch sensing unit is adjacent to the preprocessing touch sensing unit.

Mode 3B-c and mode 3B-d show two examples in which the reference touch sensing unit and the touch sensing unit to be sensed are in different columns. In this case, optionally, the selection of at least one of the plurality of touch sensing units as a reference touch sensing unit further includes: selecting at least one touch sensing unit located in a different column from the plurality of to-sense touch sensing units from the plurality of touch sensing units as a reference touch sensing unit. Optionally, mode 3B-c and mode 3B-d show two examples in which the reference touch sensing unit and the touch sensing unit to be sensed are located in the same row. That is, the selection of at least one of the plurality of to-sense touch sensing units as the preprocessing touch sensing unit further includes selecting at least one to-sense touch sensing unit in the same row as the at least one reference touch sensing unit from the plurality of to-sense touch sensing units as the preprocessing touch sensing unit.

Optionally, in this case, the selection of at least one of the plurality of to-sense touch sensing units as a preprocessing touch sensing unit may also include: selecting at least one touch sensing unit to be sensed in a different row from the at least one reference touch sensing unit from the plurality of to-sense touch sensing units as the preprocessing touch sensing unit. As shown in mode 3B-c and mode 3B-d, the reference touch sensing unit is not adjacent to the preprocessing touch sensing unit. Of course, the reference touch sensing unit and the touch sensing unit to be sensed may also be located in different rows and columns, which is not limited in this disclosure.

In addition, other touch sensing units may also be selected as reference touch sensing units. For example, in some embodiments, for convenience of calculation, the row where the reference touch sensing units are located may be the uppermost row or the lowermost row of the array composed of the plurality of touch sensing units.

Referring to FIGS. 3E and 3F, at step S304, at least one capacitance sensing signal is yielded from at least one reference sensing signal and at least one second touch sensing signal. In FIGS. 3E and 3F, Cs1 is the equivalent self-capacitance value corresponding to the preprocessing touch sensing unit, and Cs2 is the equivalent self-capacitance value corresponding to the reference touch sensing unit. Cs3 is the equivalent self-capacitance value corresponding to the touch sensing unit without being applied any excitation signal in the second time period. Vn is the equivalent noise voltage suffered by the preprocessing touch sensing unit and the reference touch sensing unit (for convenience of description, corresponding noise signals may also be denoted by Vn respectively). Tx1 is the second touch excitation signal applied to the preprocessing touch sensing unit Cs1 in the second time period, and Tx2 (FIG. 3F) or DC (FIG. 3E) is the touch reference signal applied to the touch sensing unit Cs2 in the second time period.

Although only one pair of reference touch sensing unit and preprocessing touch sensing unit is shown in FIGS. 3E-3F, it should be understood by those skilled in the art that this is only for describing the embodiments of the present disclosure more clearly, and actually more pairs of reference touch sensing unit and preprocessing touch sensing unit should be included.

In many cases, the self-capacitance of each touch sensing unit is equal (the areas of the touch pads of the touch electrodes are almost equal). In a case where the touch reference signal is a DC signal, as shown in FIG. 3E, the voltage Vcs1 (corresponding to the capacitance value of Cs1) of the capacitance sensing signal obtained from the reference sensing signal and the second touch sensing signal, may be calculated based on formula (3) as follows.

$$Vcs1 = Gs2 \times Gs1 \times (Vx1 \times Cs1 + Vn \times Cn - Vn \times Cn) \quad (3)$$

Vx1 in formula (3) represents the voltage of the second touch excitation signal Tx1. The value of Vn×Cn−Vn×Cn in formula (3) is 0 or a relatively small value close to 0, that is, the noise signal is removed, so that Vcs1 basically corresponds to the voltage of Cs1. At this time, Vcs1=Gs2×Gs1×Vx1×Cs1.

In a case where the touch reference signal is a variable signal TX2, as shown in FIG. 3F, TX1 and TX2 are the same variable signals. It may be known from the formula (4) below, $$Vcs1 = Gs2 \times Gs1 \times (Vx1 \times Cs1 + Vn \times Cn - Vx2 \times Cs2 - Vn \times Cn) \quad (4)$$

In formula (4), Vx1 represents the voltage of the second touch excitation signal TX1, and Vx2 represents the voltage of the touch reference signal TX2. The value of Vn×Cn−Vn×Cn in formula (4) is 0 or a relatively small value close to 0, that is, the noise signal is removed, so that Vcs1 only needs the voltage difference corresponding to the voltage of the second touch sensing signal and the voltage of the reference sensing signal. At this time, Vcs1=Gs2×Gs1×Cs1×(Vx1−Vx2). With Vx1−Vx2, the range of Vcs1 may be dynamically adjusted.

Then, at step S305, the capacitance values of a plurality of to-sense touch sensing units may be yielded according to the plurality of differential sensing signals and the at least one capacitance sensing signal described above. Each of the capacitance values of the plurality of to-sense touch sensing units has noise removed. Thus, it may be determined whether touch occurs in the first time period.

As described above, the "differences" between a plurality of capacitances are obtained at step S301. For example, the information of the difference between Cs1 and Cs2 corresponding to the to-sense touch sensing units, and the information of the difference between the to-sense touch sensing units Cs2 and Cs3. At step S304, the information of the capacitance corresponding to Cs1, which is the preprocessing touch sensing unit, is obtained. Based on the information of the difference between Cs1 and Cs2 corresponding to the to-sense touch sensing units as well as the information of the capacitance of Cs1 corresponding to the pre-processed touch sensing unit, the information of the capacitance corresponding to the to-sense touch sensing unit Cs2 may be determined. Based on the information of the difference between Cs2 and Cs3 corresponding to the to-sense touch sensing units as well as the information of the capacitance corresponding to the to-sense touch sensing unit Cs2, the information of the capacitance corresponding to the to-sense touch sensing unit Cs3 may be determined.

In a similar fashion, the information of the capacitances corresponding to all to-sense touch sensing units at step S301 may be obtained, and none of the information contains noise, which may significantly reduce the influence of noise caused by display, fingerprint recognizing and other operations on touch sensing of the touch panel, thereby making it easier to determine whether touch occurs.

Another touch sensing method for a touch panel according to an embodiment of the present disclosure will be described in detail below with reference to FIGS. 4A-4E.

FIG. 4A shows a schematic flowchart of a touch sensing method 400 for a touch panel according to an embodiment of the present disclosure. This touch sensing method may be used in the touch sensing apparatus shown in FIG. 1. In method 400, the first group of the touch sensing units and the second group of the touch sensing units work simultaneously.

As shown in FIG. 4A, at step S401, in a first sensing period, a plurality of touch excitation signals are applied to a first group (for example, Cs1-Cs4 of FIG. 4C-4D) of the touch sensing units to obtain a plurality of first touch sensing signals, and at least one touch reference signal are applied to at least one (for example, Cs5 of FIG. 4C-4D) of a second group (for example, Cs5-Cs8 of FIG. 4C-4D) of the touch sensing units to obtain at least one first reference sensing signal. At step S402, the plurality of touch excitation signals are applied to the second group (for example, Cs5-Cs8 of FIG. 4C-4D) of the touch sensing units to obtain a plurality of second touch sensing signals, and the at least one touch reference signal are applied to at least one (for example, Cs1 of FIG. 4C-4D) of the first group (for example, Cs1-Cs4 of FIG. 4C-4D) of the touch sensing units to obtain at least one second reference sensing signal. At step S403, a plurality of capacitance values of the plurality of touch sensing units are acquired according to the plurality of first touch sensing signals, the at least one first reference sensing signal, the plurality of second touch sensing signals and the at least one second reference sensing signal.

Optionally, the acquiring a plurality of capacitance values of the plurality of touch sensing units includes obtaining a plurality of differential sensing signals from the plurality of first touch sensing signals; obtaining at least one capacitance sensing signal from at least one of the plurality of first touch sensing signal and the at least one first reference sensing signal; acquiring capacitance values of the plurality of touch sensing units, according to the plurality of differential sensing signals and the at least one capacitance sensing signal.

Optionally, the acquiring a plurality of capacitance values of the plurality of touch sensing units includes obtaining a plurality of differential sensing signals from the plurality of second touch sensing signals; obtaining at least one capacitance sensing signal from at least one of the plurality of second touch sensing signal and the at least one second reference sensing signal; acquiring capacitance values of the plurality of touch sensing units, according to the plurality of differential sensing signals and the at least one capacitance sensing signal.

The above steps are further described below with reference to FIGS. 4B to 4E. Optionally, each touch sensing circuit has a corresponding touch sensing unit for sensing a touch occurring on it and outputting a touch signal. For example, when a user's finger or pen touches or approaches the touch sensing unit, the touch sensing circuit may sense the capacitance change at the touch sensing unit, so that the touch sensing circuit may output a touch sensing signal indicating the change to the subsequent corresponding operation unit.

Optionally, the plurality of touch sensing units may be a plurality of touch sensing units arranged in an array. For example, referring to FIG. 4B, it shows five ways of selecting the to-sense touch sensing unit and the reference touch sensing unit (shown by reference numerals 4B-a to 4B-e). Among them, the reference touch sensing units are shown in gray squares, and a plurality of to-sense touch sensing units in one column are shown in squares filled with diagonal lines. Those skilled in the art should understand that modes 4B-a to 4B-e are only examples, and the reference touch sensing unit and the to-sense touch sensing unit may be selected in other ways, which is not limited in the present disclosure.

Figure 4B:
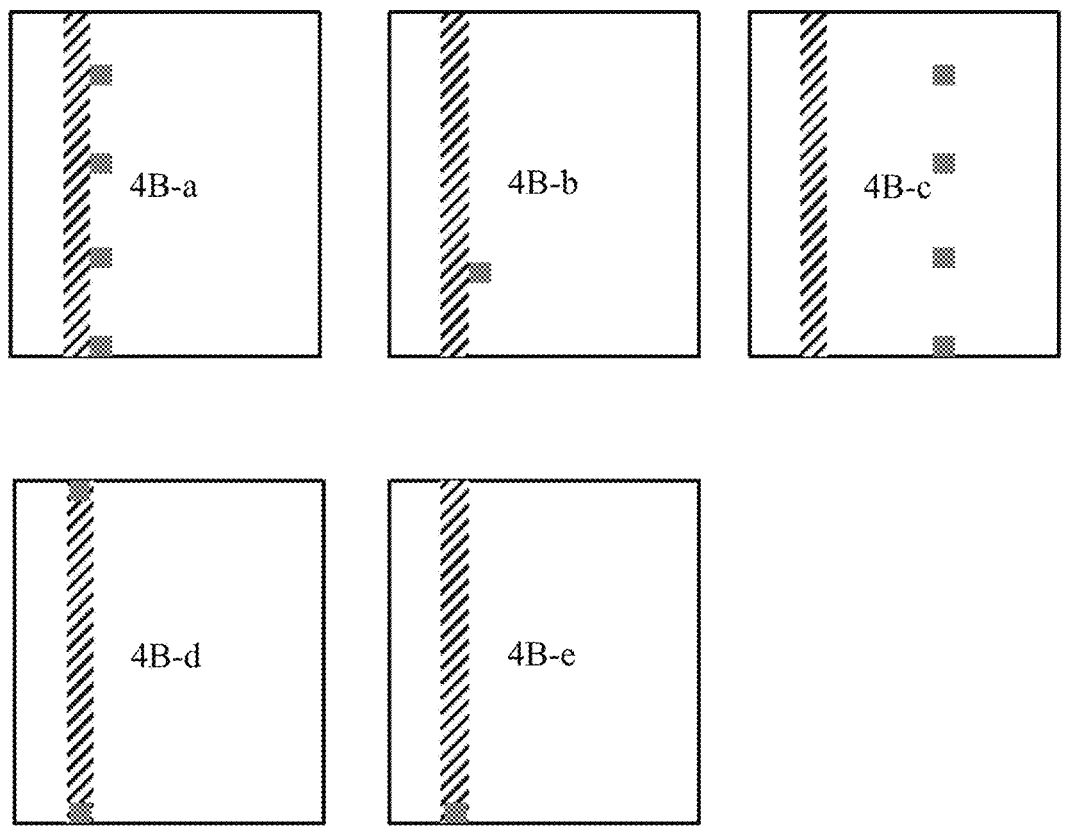
FIG. 4B shows six ways of selecting a to-sense touch sensing unit and a reference touch sensing unit according to an embodiment of the present disclosure.

Optionally, the first group of touch sensing units are in the same column among the many touch sensing units available. In FIG. 4B, the columns filled with diagonal lines show the touch sensing units of the same column, and optionally, each touch sensing unit in the column is selected as the to-sense touch sensing unit. In a first time period, each touch sensing unit in the column is applied with a first touch sensing signal. In this column, a differential sensing signal may be obtained from the first touch sensing signals corresponding to every two touch sensing units. In FIG. 4B, a reference touch sensing unit identified by a gray square is applied with a touch reference signal in a second time period.

Optionally, referring to modes 4B-a to 4B-c, the first group of touch sensing units and the second group of touch sensing units are in the different column among the many touch sensing units available. As shown in mode 4B-a and mode 4B-b, the first group of touch sensing units is adjacent to the second group of touch sensing units. As shown in mode 4B-c, the second group of touch sensing units are not adjacent to the first group of touch sensing units.

Optionally, referring to mode 4B-d to 4B-e, the first group of touch sensing units and the second group of touch sensing units are in the same column among the many touch sensing units available. As shown in mode 4B-d to 4B-e, the second group of touch sensing units is adjacent to the first group of touch sensing units. Those skilled in the art should understand that FIG. 4B is only an example, and the arrangement form of the to-sense touch sensing units and the reference touch sensing unit may be set in other ways, which is not limited in this disclosure.

In mode 4B-d and mode 4B-e, although the row in which the touch sensing unit of the second group is located is the uppermost row or the lowermost row of the array composed of the plurality of touch sensing units, those skilled in the art should understand that this disclosure is not limited thereto. The first group and the second group of touch sensing units are applied with the touch excitation signals and the touch reference signal respectively at the same time.

Figure 4C:
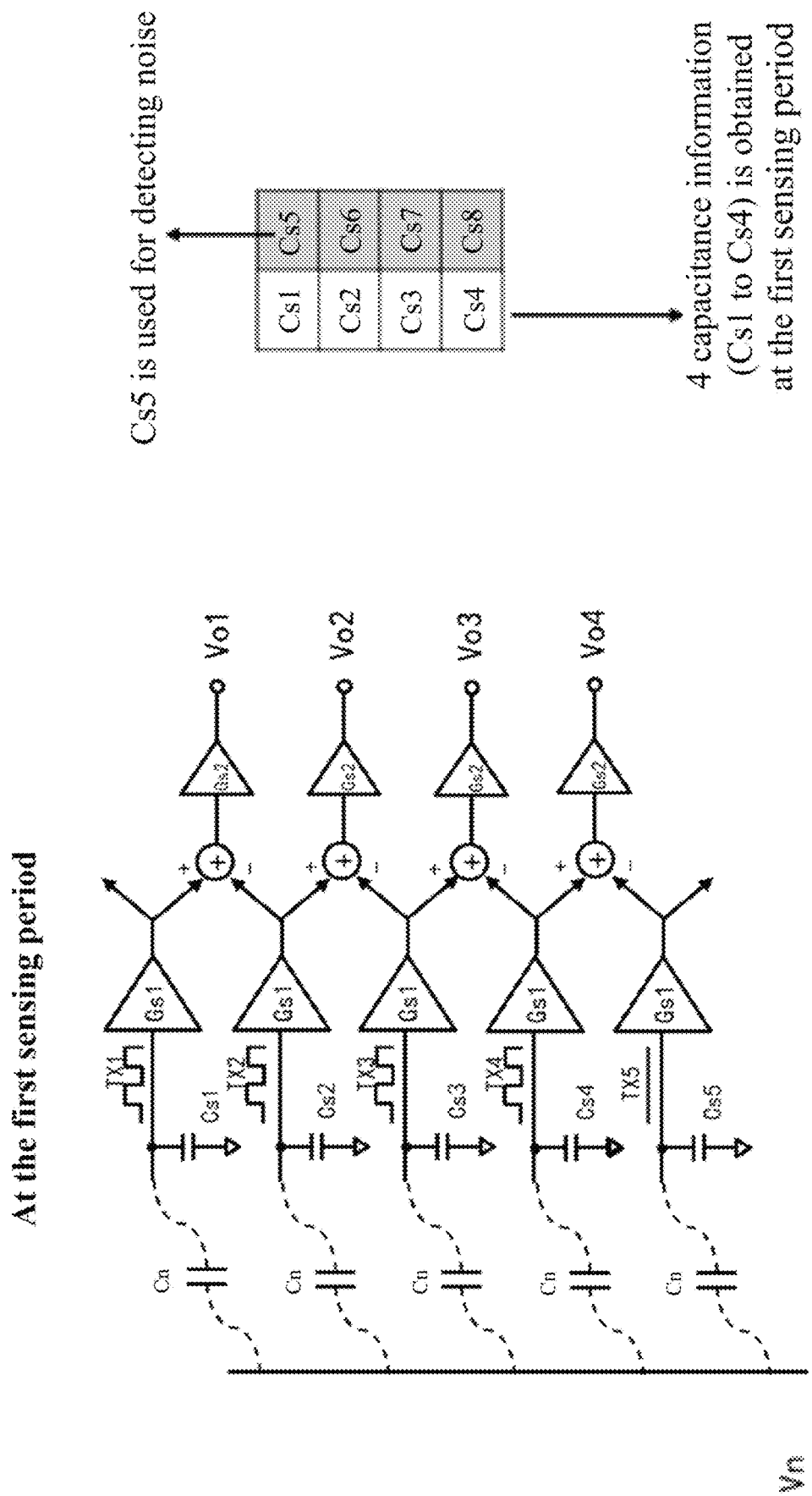
FIG. 4C shows an equivalent circuit for applying excitation signals to 8 to-sense touch sensing units in the first sensing period according to an embodiment of the present disclosure.
Figure 4D:
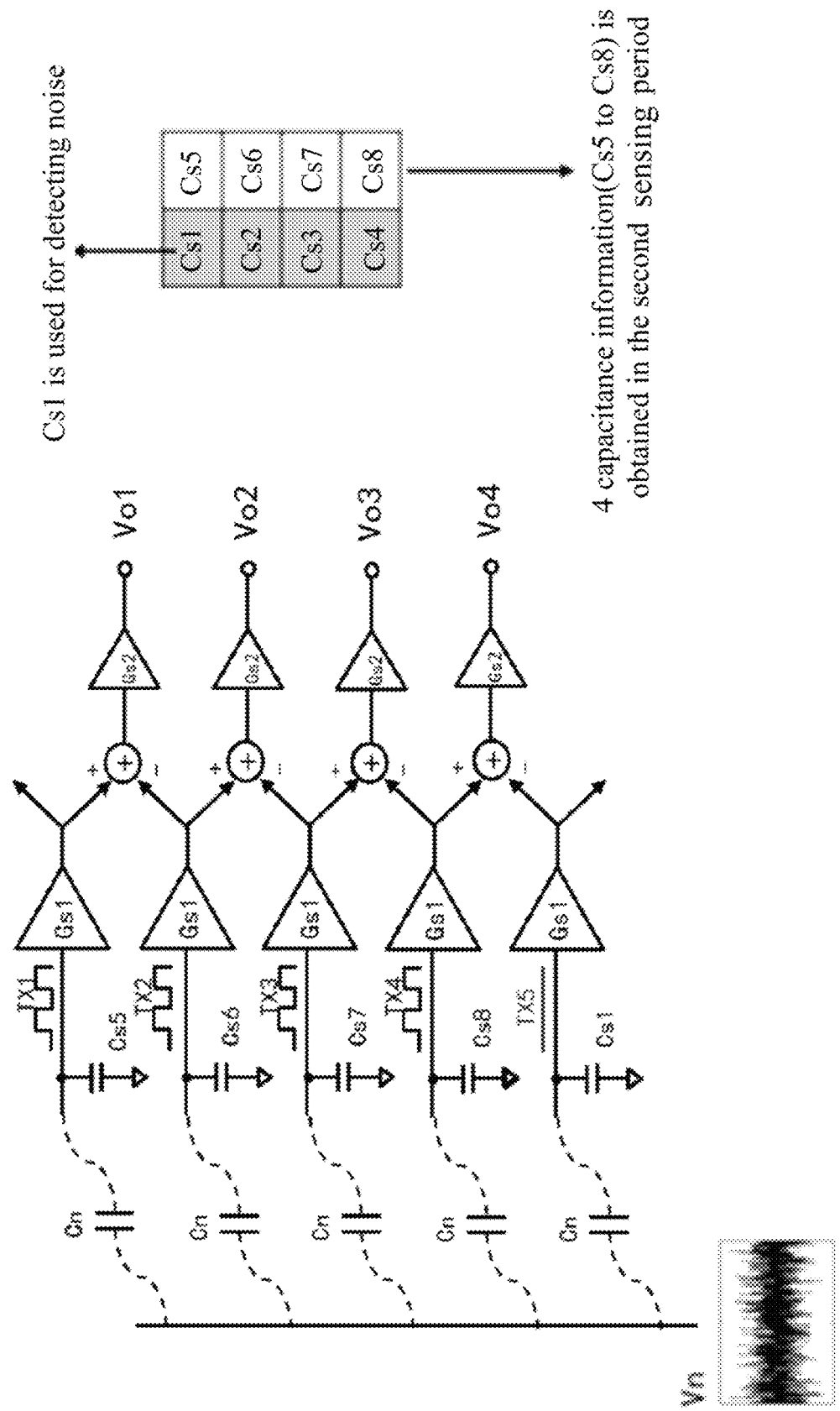
FIG. 4D shows an equivalent circuit for applying excitation signals to 8 to-sense touch sensing units in the second sensing period according to an embodiment of the present disclosure.
Figure 4E:
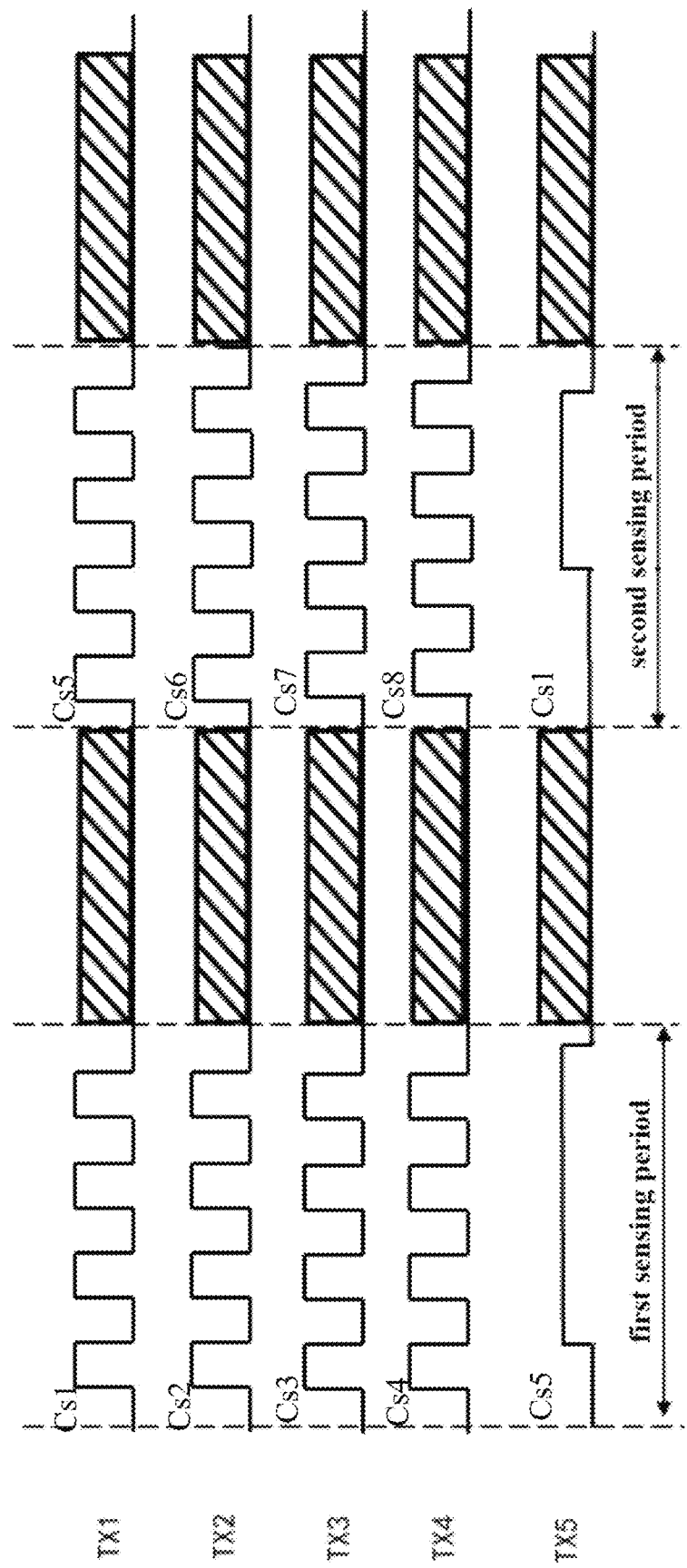
FIG. 4E shows a timing chart when touch sensing is performed on 8 to-sense touch sensing units according to an embodiment of the present disclosure.

FIG. 4C shows an equivalent circuit for applying excitation signals to 8 to-sense touch sensing units in the first sensing period according to an embodiment of the present disclosure. FIG. 4D shows an equivalent circuit for applying excitation signals to 8 to-sense touch sensing units in the second sensing period according to an embodiment of the present disclosure. FIG. 4E shows a timing chart when performing touch sensing on 8 to-sense touch sensing units according to an embodiment of the present disclosure. FIG. 4C to 4E are only examples to facilitate illustration, and those skilled in the art should understand that the touch panel may include more or less touch sensing units, and their timing may also be set correspondingly, which is not limited in this disclosure.

Optionally, referring to FIGS. 4C and 4E, touch excitation signals are applied to 4 to-sense touch sensing units (Cs1 to Cs4) in the first sensing period to yield a plurality of first touch sensing signals, and a touch reference signal is applied to the touch sensing unit Cs5 of the second group in the first sensing period to yield a first reference sensing signal. At this time, the touch sensing unit Cs5 of the second group only detects noise. Hereinafter, touch sensing units (Cs1 to Cs4) are also referred as a first group of the touch sensing units, while touch sensing units (Cs5 to Cs8) are also referred as a second group of the touch sensing units.

A plurality of differential sensing signals (Vo1 to Vo4) are obtained from the plurality of first touch sensing signals. Among them, each differential sensing signal is associated with the difference of capacitance values corresponding to two of the to-sense touch sensing units. The process of acquiring the differential sensing signals (Vo1 to Vo4) is similar to step S301 in method 300, and will not be described repeatedly here.

The capacitance sensing signal corresponding to Cs4 may be yielded from the first touch sensing signal corresponding to Cs4 and the reference sensing signal corresponding to Cs5. The capacitance sensing signal is associated with the capacitance value corresponding to the to-sense touch sensing unit which corresponds to the first touch sensing signal (i.e., Cs4). The way of acquiring the capacitance sensing signal is similar to step S304 in method 300, and will not be described repeatedly here.

Although in FIG. 4C, the touch sensing unit Cs4 and the touch sensing unit Cs5 are in different rows, it may be understood by those skilled in the art that they may also be in the same row for convenience of calculation. Although in FIG. 4C, the touch sensing unit Cs5 and the touch sensing unit Cs4 corresponding to the second touch sensing signal are not adjacent, it may be understood by those skilled in the art that they may also be adjacent for convenience of calculation. Optionally, the row in which the touch sensing unit of the second group is located may also be the uppermost row or the lowermost row of the array composed of the plurality of touch sensing units, which is not limited in this disclosure.

Then, capacitance values of a plurality of touch sensing units (Cs1 to Cs4) are obtained according to the plurality of differential sensing signals (Vo1 to Vo4) and the capacitance sensing signal (corresponding to Cs4). Similar to method 300, method 400 may derive the capacitance information of Cs1 to Cs4 by the difference information between Cs1 and Cs2, the difference information between Cs2 and Cs3, the difference information between Cs3 and Cs4, and the capacitance information of Cs4.

With reference to FIGS. 4D and 4E, touch excitation signals are applied to 4 touch sensing units (Cs5 to Cs8) to obtain a plurality of second touch sensing signals in the second sensing period, and a touch reference signal is applied to the touch sensing unit Cs1 in the second sensing period to obtain a second reference sensing signals. At this time, the reference touch sensing unit Cs1 is only used for noise detection. The capacitance sensing signal corresponding to Cs8 may be yielded from the second touch sensing signal corresponding to Cs8 and the reference sensing signal corresponding to Cs1. The capacitance sensing signal is associated with the capacitance value corresponding to the touch sensing unit which corresponds to the second touch sensing signal (i.e., Cs8). Similarly to the above process, the capacitance values of the plurality of touch sensing units (Cs5 to Cs8) may be acquired.

Therefore, in method 400, the first group of the touch sensing units and the second group of the touch sensing units may work at the same time to reduce the influence of noise caused by displaying, fingerprint recognizing, and other operations on the touch sensing of the touch panel.

The positional relationship between the touch sensing unit corresponding to the second touch sensing signal and the touch sensing unit corresponding to the reference sensing signal according to an embodiment of the present disclosure will be described in detail below with reference to FIG. 5. The positional relationship shown in FIG. 5 may be used in method 300 as well as used in method 400. For the convenience of understanding, in FIG. 5, the touch sensing units corresponding to the second touch sensing signals are identified with white squares as before; the touch sensing units corresponding to the reference sensing signals are identified with gray squares.

Figure 5:
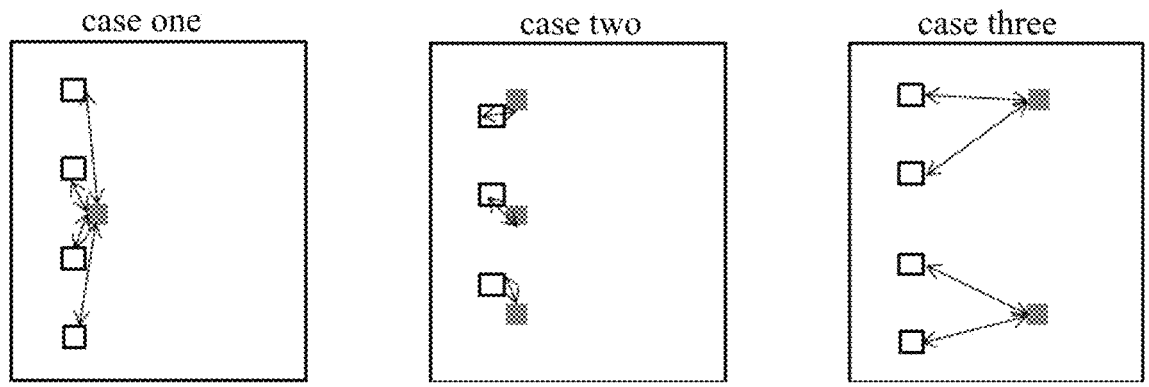
FIG. 5 shows a positional relationship between a touch sensing unit corresponding to a second touch sensing signal and a touch sensing unit corresponding to a reference sensing signal according to an embodiment of the present disclosure.

Optionally, as shown in FIG. 5, a plurality of touch sensing circuits may be selectively configured into different types of touch sensing circuits according to different configuration modes. For example, the touch sensing unit corresponding to the second touch sensing signal and the touch sensing unit corresponding to the reference sensing signal may be in the mode of all-to-one (shown as case one), one-to-one, and several-to-one (shown as case three). The correspondence in FIG. 5 is shown by a double-headed arrow. Generally, the number of touch sensing units corresponding to the second touch sensing signal is greater than or equal to the number of touch sensing units corresponding to the reference sensing signal, and this disclosure is not limited thereto.

For example, referring to cases one and three, in the case of all-to-one and several-to-one, the amount of the at least one reference sensing signal is a first number, and the amount of the at least one second touch sensing signal is a second number. The second number is the first number multiplied by a third number. For example, in case one, the amount of reference sensing signals is 1, the amount of second touch sensing signals is 4, and the third number is 4. In case three, the amount of reference sensing signals is 2, the amount of second touch sensing signals is 4, and the third number is 2.

At this time, the at least one reference sensing signal and the at least one second touch sensing signal are grouped into a first number of signal combinations, each signal combination includes one said reference sensing signal and a third number of said second touch sensing signals, and each signal combination yields a third number of said capacitance sensing signals. For example, in case one, 1 reference sensing signal and 4 second touch sensing signals form 1 signal combination. The signal combination includes 1 reference sensing signal and 4 second touch sensing signals, and yields 4 capacitance sensing signals. In case three, 2 reference sensing signals and 4 second touch sensing signals form 2 signal combinations, each signal combination including 1 reference sensing signal and 2 second touch sensing signals, and 2 capacitance sensing signals are generated.

For another example, in a one-to-one case, the amount of the at least one reference sensing signal is a first number, and the amount of the at least one second touch sensing signal is a second number, which is equal to the first number. For example, in case two, the number of a portion of reference sensing signals is 2, and the number of a portion of second touch sensing signals is 2. 2 reference sensing signals and 2 second touch sensing signals are grouped into 2 signal combinations, each signal combination including one reference sensing signal and one second touch sensing signal, and each signal combination generating one capacitance sensing signal.

It should be understood that according to the specific configuration, one touch sensing circuit may correspond to one reference touch sensing unit to process reference sensing signals, and may also correspond to another to-sense touch sensing unit to process first touch sensing signals, and may also correspond to a preprocessing touch sensing unit to process second touch sensing signals. That is, the touch sensing circuit and the touch sensing unit may correspond in various ways as long as they may realize touch sensing of all the touch sensing units through timing control or the like.

Figure 6:
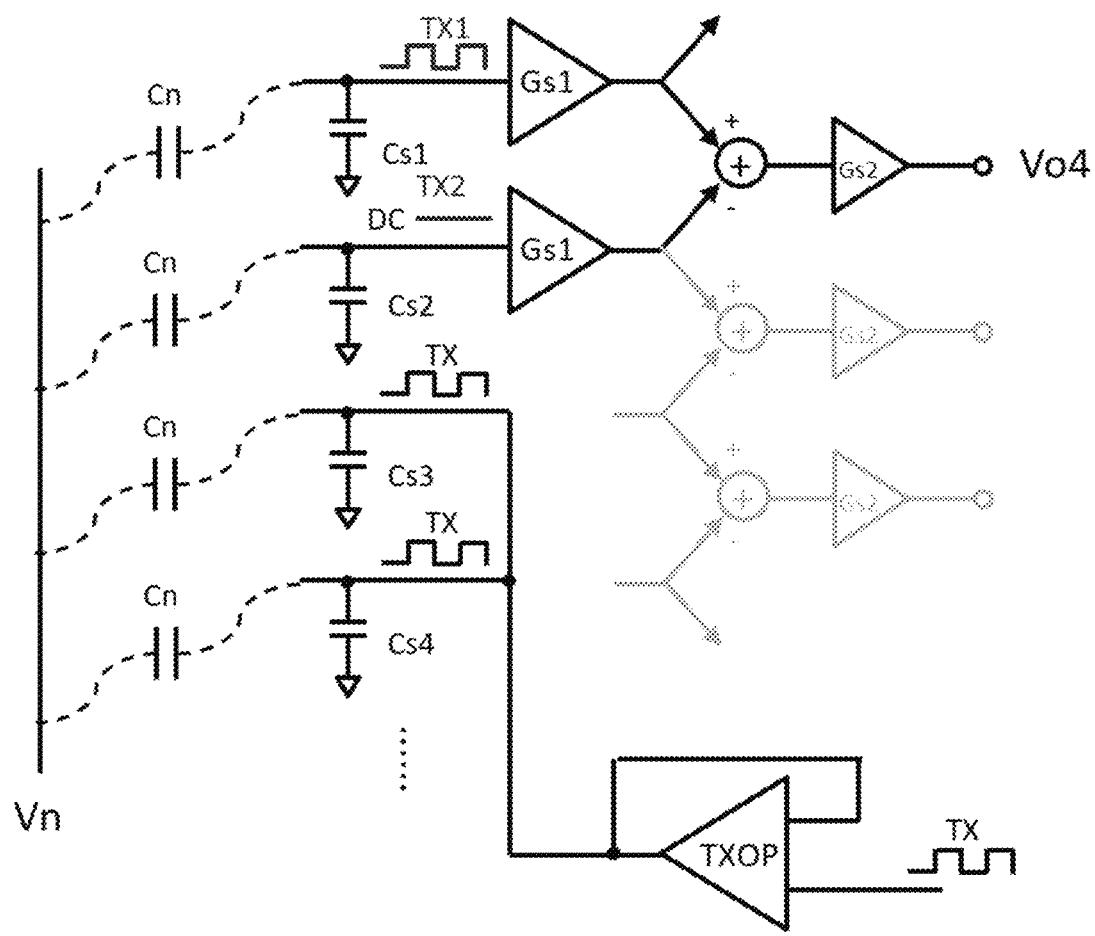
FIG. 6 shows an equivalent circuit diagram of applying an anti-loading driving signal according to an embodiment of the present disclosure.

Next, an anti-loading driving signal according to an embodiment of the present disclosure will be further illustrated with reference to FIG. 6. Optionally, an anti-loading driving signal may be applied to other non-touch sensing lines in a period of touch sensing. For example, the anti-loading drive signal can be applied to the gate line or the data line. Optionally, the anti-loading driving signal may also be applied as TX3 on any inactive touch sensing line in the second time period shown in FIG. 3D, for example, the touch sensing line corresponding to Cs3 in FIG. 3F.

An anti-loading driving signal essentially the same as the excitation signal that drives the fingerprint recognition unit/display unit. As shown in FIG. 1, the touch-and-display panel 200 is integrated with a touch panel 210 and a display panel 220. Optionally, the touch-and-display panel may further be integrated with a fingerprint recognizing panel, on which a fingerprint recognizing unit is arranged. Since the display panel 220, the touch panel 210, and the fingerprint recognizing panel have overlapping areas, the fingerprint recognizing operation, the touch sensing operation, and the display driving operation may interfere with each other. For example, since the display panel 220, the touch panel 210 and the fingerprint recognizing panel are close to each other, there exists a coupling capacitance that cannot be ignored between each wire connecting the touch sensing unit and each wire connecting the fingerprint sensing unit. By applying an anti-loading drive signal, the fingerprint recognition operation or display operation can be made independent of the coupling capacitance, further reducing the interference between the individual circuits integrated in this touch panel.

Figure 7A:
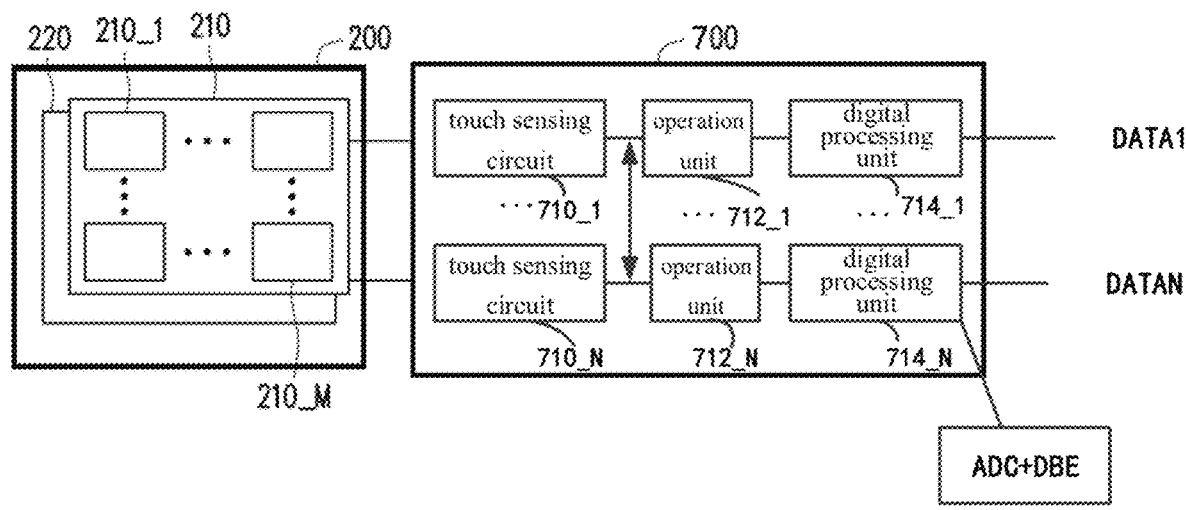
FIGS. 7A-7B show schematic diagrams of a touch sensing apparatus 700 according to an embodiment of the present disclosure.
Figure 7B:
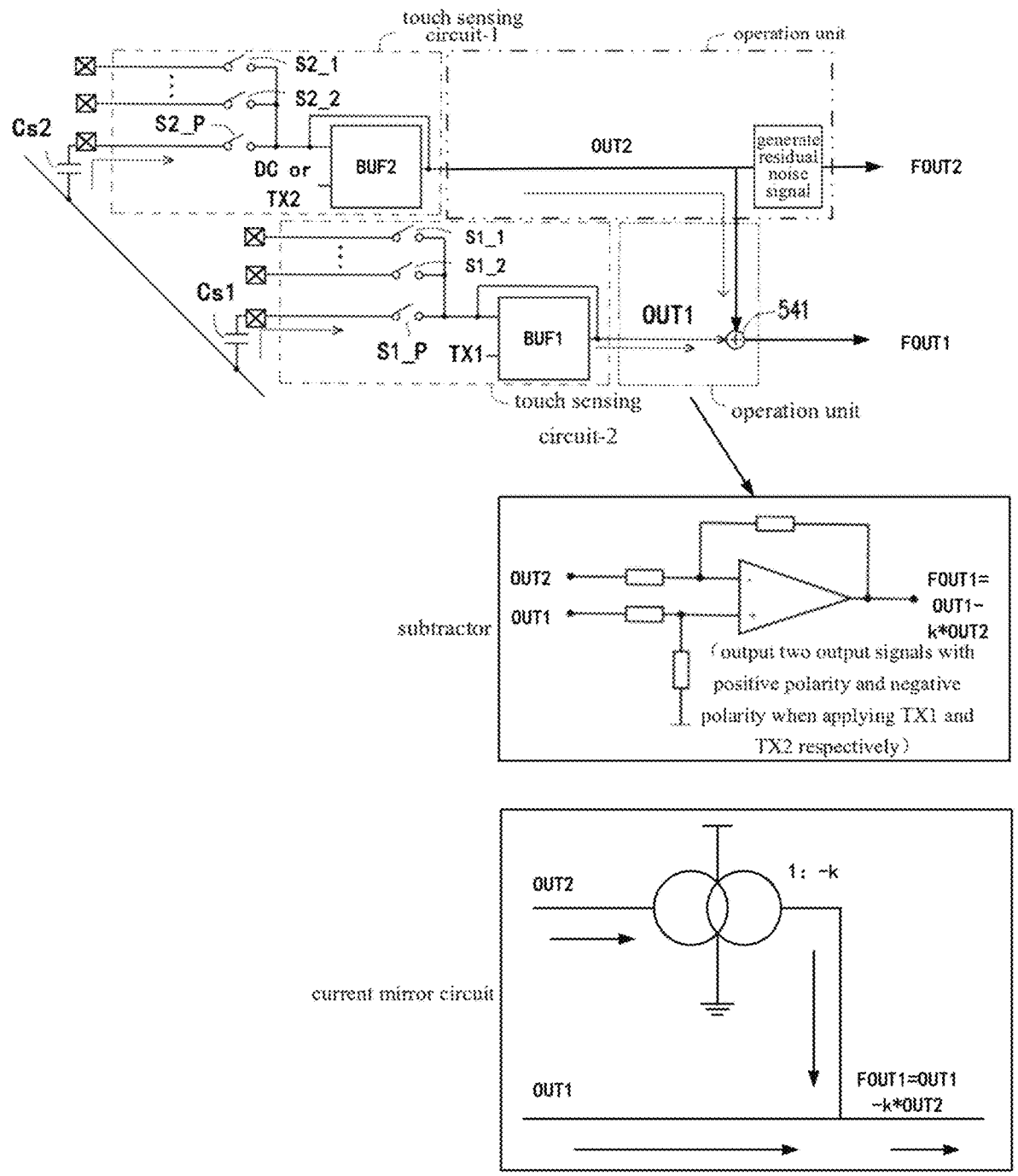

Correspondingly, the embodiments of the present disclosure also provide a touch sensing apparatus for the touch panel. FIGS. 7A-7B show schematic diagrams of a touch sensing apparatus 700 according to an embodiment of the present disclosure. The touch sensing apparatus 700 has a structure similar to that of the touch sensing apparatus 100 described with reference to FIG. 1, except that more details are shown. The touch sensing apparatus 700 will be described in more detail below.

The touch sensing apparatus 700 performs sensing on a plurality of touch sensing units 210_1~210_M included in a touch panel 210, where M is a positive integer.

In the embodiments of the present disclosure, the touch sensing apparatus 700 may include a plurality of touch sensing circuits (710_1~710_N) and a plurality of operation units (712_1~712_N) in a one-to-one correspondence, and N is a positive integer. Each touch sensing circuit has corresponding touch sensing unit (or units). For example, each touch sensing circuit corresponds to one touch sensing unit, or corresponds to multiple touch sensing units.

When a touch sensing circuit is selected to apply a first touch excitation signal or a second touch excitation signal to a touch sensing unit, a first terminal of the touch sensing circuit (for example the touch sensing circuit-2 in FIG. 7B) is configured to receive the touch excitation signal (TX1), and a second terminal thereof is configured to apply the touch excitation signal (TX1) to a corresponding touch sensing unit and receive a touch sensing signal from the corresponding touch sensing unit, and an output terminal thereof outputs a first output signal.

When a touch sensing circuit is selected to apply a touch reference signal to a touch sensing unit, a first terminal of the touch sensing circuit receives the touch reference signal (DC/TX2) and a second terminal thereof applies the touch reference signal (DC/TX2) to a corresponding touch sensing unit and receives a reference sensing signal from the corresponding touch sensing unit, and an output terminal thereof outputs a second output signal, where the touch reference signal (DC/TX2) and the touch excitation signal (TX1) are different signals.

For example, the touch excitation signal is a first variable signal (for example, a signal with variable amplitude and/or frequency), and the touch reference signal is a direct current signal or a second variable signal different from the first variable signal.

For the selection of the touch excitation signal and the touch reference signal, when the touch excitation signal is the first variable signal and the touch reference signal is a direct current signal, the second output signal output by the touch sensing circuit-1 only includes a noise signal, while the first output signal output by the touch sensing circuit-2 includes a noise signal and a first touch signal. Therefore, as will be described later, when the operation unit corresponding to the touch sensing circuit-2 performs subtraction on the first output signal and the second output signal, the signal output by the operation unit only includes the first touch signal. When the touch excitation signal is the first variable signal and the touch reference signal is the second variable signal, the second output signal output by the touch sensing circuit-1 includes a noise signal and a second touch signal, while the first output signal output by the touch sensing circuit-2 includes a noise signal and the first touch signal. Therefore, as will be described later, when the operation unit corresponding to the touch sensing circuit-2 performs subtraction on the first output signal and the second output signal, the signal output by the operation unit is the differential signal between the voltage, current signal corresponding to the first touch signal and the voltage, current signal corresponding to the second touch signal. At the same time, setting the second variable signal to be different from the first variable signal may be better suited to situations where the self-capacitance values of the touch sensing units are unequal. This has been described in detail in the content described with reference to FIGS. 3-5, so it will not be repeated here.

Touch sensing circuit-2 or touch sensing circuit-1 may correspond to one touch sensing unit, or may correspond to multiple touch sensing units of the same number. For example, each touch sensing circuit-2 may correspond to only one touch sensing unit (that is, apply the touch excitation signal to the one touch sensing unit and obtain the touch sensing signal from it), and the touch sensing circuit-1 corresponding to the touch sensing circuit-2 may correspond to another touch sensing unit. For example, each touch sensing circuit-2 may correspond to the touch sensing units on the same row or column, and correspondingly, the touch sensing circuit-1 corresponding to the touch sensing circuit-2 may correspond to the touch sensing units on another row or column.

Therefore, in this case, FIG. 7B shows more details of the touch sensing circuits (a pair) and the operation units. As shown in FIG. 7B, the touch sensing circuit-2 includes a buffer (BUF1) and a first group of switches (S1_1 . . . S1_P), and the touch sensing circuit-1 includes a buffer (BUF2) and a second group of switches (S2_1 . . . S2_P), the number of switches in the first group of switches being the same as the number of switches in the second group of switches. First terminals of the switches in the first group of switches are all connected to a second terminal of the buffer of the same touch sensing circuit-2, and second terminals of the switches in the first group of switches are respectively connected to respective touch sensing units corresponding to the touch sensing circuit-2 in a one-to-one manner, and a first terminal and an output terminal of the buffer of the touch sensing circuit-2 respectively serve as a first terminal and an output terminal of the touch sensing circuit-2. First terminals of the switches in the second group of switches are all connected to a second terminal of the buffer of the same touch sensing circuit-1, and second terminals of the switches in the second group of switches are respectively connected to respective touch sensing units corresponding to the touch sensing circuit-1 in a one-to one manner, and a first terminal and an output terminal of the buffer of the touch sensing circuit-1 respectively serve as a first terminal and an output terminal of the touch sensing circuit-1.

The simultaneous or sequential application of the touch excitation signal or touch reference signal to respective touch sensing units and simultaneous or sequential reception of sensing signals may be realized by simultaneously or sequentially performing switch control on respective switches in the first group or the second group of switches.

The plurality of operation units (712_1~712_N) are configured to calculate, according to the first number of first output signals and the second number of second output signals, a differential signal between the output signals of each touch sensing circuit-2 and the corresponding touch sensing circuit-1, the differential signal being associated with a capacitance difference sensed by the touch sensing circuit-2 and the corresponding touch sensing circuit-1.

For example, a touch sensing circuit-2 provides a first output signal to one corresponding operation unit, and a touch sensing circuit-1 corresponding to the touch sensing circuit-2 will also provide a second output signal to one operation unit corresponding to the touch sensing circuit-1 and to the operation unit corresponding to the touch sensing circuit-2. The operation unit corresponding to the touch sensing circuit-2 performs subtraction on the first output signal and the second output signal to obtain the differential signal. The value of the differential signal is associated with the capacitance difference sensed by the touch sensing circuit-2 and the corresponding touch sensing circuit-1, so the differential signal may be used to obtain the capacitance difference, as the operations performed by the digital processing units and subsequent controller as described in the context.

As mentioned above, in some cases, for each pair of the touch sensing circuit-2 and the touch sensing circuit-1, the areas of contact pads of the touch electrodes of their respective touch sensing units may not be equal, so it is necessary for the operation unit corresponding to the touch sensing circuit-2 to multiply the second output signal output by the corresponding touch sensing circuit-1 by a preset coefficient, and perform the subtraction on the first output signal and the second output signal multiplied by the preset coefficient, to obtain the differential signal, where, as mentioned above, the preset coefficient is related to the ratio between the areas of the contact pads of the touch electrodes of the touch sensing units respectively corresponding to the touch sensing circuit-2 and the corresponding touch sensing circuit-1.

In addition, when the touch excitation signal received by the touch sensing circuit-2 and the touch reference signal received by the corresponding touch sensing circuit-1 are two variable signals with same phases but different amplitudes, the ratio of the amplitudes of the two variable signals is related to the ratio between the areas of the contact pads of the touch electrodes of the touch sensing units respectively corresponding to the touch sensing circuit-2 and the corresponding touch sensing circuit-1.

For example, the first output signal and the second output signal may be voltage signals. Therefore, as shown in FIG. 7B, each operation unit includes a subtractor circuit, and two input terminals of the subtractor circuit receive the first output signal output by the touch sensing circuit-2 and the second output signal output by the corresponding touch sensing circuit-1 for subtraction, so as to output the differential signal. The value of the differential signal is equal to the difference between the value of the first output signal and the value of the second output signal.

For another example, the first output signal and the second output signal may be current signals. Therefore, as shown in FIG. 7B, each operation unit includes a current mirror circuit, and an input terminal of the current mirror circuit receives the second output signal and gets the second output signal with negative polarity. An output terminal of the current mirror circuit superposes the first output signal with the second output signal with negative polarity and outputs it.

Similarly, in some embodiments, since the signals output by the operation units are all analog signals, the signals are converted into digital signals. Those digital signals are provided by the touch sensing apparatus 700 to a subsequent controller or the like for processing, to determine the capacitance difference sensed by each pair of touch sensing circuits, and then determine the touch position.

Therefore, the touch sensing apparatus 700 also includes a plurality of digital processing units (714_1~714_N) corresponding to the plurality of touch sensing circuits (710_1~710_N) and the plurality of operation units (712_1~712_N) in one-to-one correspondence, which are used to digitally process the signals output by the operation units, and finally output digital signals DATA1~DATAN.

Each digital processing unit may be used to perform, for example, analog-to-digital conversion and other digital processing, so it may include, for example, an analog-to-digital converter (ADC) and a digital back-end (DBE) circuit (the digital back-end circuit includes a digital processing circuit with related specific functions, the digital back-end circuit may also be omitted, which is not limited in this disclosure).

Similarly, in order to eliminate residual noise introduced in the following digital processing process, the touch sensing apparatus 700 may also be configured as follows.

For each pair of the touch sensing circuit-2 and the touch sensing circuit-1, the operation unit corresponding to the touch sensing circuit-1 is used to obtain an residual noise signal based on the touch sensing circuit-1, and the digital processing unit corresponding to the touch sensing circuit-1 processes the residual noise signal into a first digital signal; and the operation unit corresponding to the touch sensing circuit-2 is used to obtain the first output signal output by the touch sensing circuit-2 and the second output signal output by the corresponding touch sensing circuit-1, and obtain the differential signal by calculation, and the digital processing unit corresponding to the touch sensing circuit-2 processes the differential signal into a second digital signal.

The second digital signal and the first digital signal are provided to a controller, and the controller may perform subtraction on the two digital signals to obtain a difference digital signal. The difference digital signal no longer includes the residual noise and is associated with the capacitance difference sensed by the touch sensing circuit-2 and the corresponding touch sensing circuit-1.

According to yet another aspect of the present disclosure, there is also provided an electronic device including a touch panel, a touch sensing apparatus, and a controller. The touch panel includes a plurality of touch sensing units. The touch sensing apparatus may be the touch sensing apparatus 700 described with reference to FIGS. 7A-7B. The controller determines the touch position based on the signals provided from the touch sensing apparatus, for example, based on digital signals, determines a plurality of capacitance differences sensed by respective pairs of touch sensing circuits in the touch sensing apparatus, so as to determine the touch position based on respective capacitance differences.

Although the present invention has been disclosed in the above embodiments, it is not intended to limit the present invention. Anyone with ordinary knowledge in the relevant technical field may make some changes and modifications without departing from the spirit and scope of the present invention. Therefore, the protection scope of the present invention shall be subject to those defined by the appended claims.

What is claimed is:

1. A touch sensing method for a touch panel, the touch panel including a plurality of touch sensing units, the touch sensing method including:
   in a first sensing period,
   applying a plurality of touch excitation signals to a first group of the touch sensing units to obtain a plurality of first touch sensing signals;
   applying at least one touch reference signal to at least one of a second group of the touch sensing units to obtain at least one first reference sensing signal;
   in a second sensing period;
   applying the plurality of touch excitation signals to the second group of the touch sensing units to obtain a plurality of second touch sensing signals;
   applying the at least one touch reference signal to at least one of the first group of the touch sensing units to obtain at least one second reference sensing signal; and
   acquiring a plurality of capacitance values of the plurality of touch sensing units according to the plurality of first touch sensing signals, the at least one first reference sensing signal, the plurality of second touch sensing signals and the at least one second reference sensing signal,
   wherein the acquiring a plurality of capacitance values of the plurality of touch sensing units includes:
   obtaining a plurality of differential sensing signals from the plurality of first touch sensing signals;
   obtaining at least one capacitance sensing signal from at least one of the plurality of first touch sensing signal and the at least one first reference sensing signal;
   acquiring capacitance values of the plurality of touch sensing units, according to the plurality of differential sensing signals and the at least one capacitance sensing signal,
   wherein, each differential sensing signal is associated with a difference of capacitance values corresponding to two of the first group of the touch sensing units; the at least one capacitance sensing signal is associated with the capacitance values corresponding to the touch sensing units which correspond to the at least one of the plurality of first touch sensing signal.

2. The touch sensing method according to claim 1, wherein the acquiring a plurality of capacitance values of the plurality of touch sensing units includes:
   obtaining a plurality of differential sensing signals from the plurality of second touch sensing signals;
   obtaining at least one capacitance sensing signal from at least one of the plurality of second touch sensing signal and the at least one second reference sensing signal;
   acquiring capacitance values of the plurality of touch sensing units, according to the plurality of differential sensing signals and the at least one capacitance sensing signal.

3. The touch sensing method according to claim 2, wherein, each differential sensing signal is associated with a difference of capacitance values corresponding to two of the second group of the touch sensing units;
   the capacitance sensing signal is associated with the capacitance values corresponding to the touch sensing units which corresponds to the at least one of the plurality of second touch sensing signal.

4. The touch sensing method according to claim 1, wherein the plurality of touch sensing units are a plurality of touch sensing units arranged in an array, the first group of the touch sensing units are located in a first column from the plurality of touch sensing units, and the second group of the touch sensing units are located in a second column from the plurality of touch sensing units, the first column and the second column are different columns.

5. The touch sensing method according to claim 4, wherein, at least one of the first group of the touch sensing units is in the same row as at least one of the second group of the touch sensing units.

6. The touch sensing method according to claim 4, wherein, at least one of the first group of the touch sensing units is in a different row as at least one of the second group of the touch sensing units.

7. The touch sensing method according to claim 4, wherein at least one of the first group of the touch sensing units or the second group of the touch sensing units is located is the uppermost row or the lowermost row of the array composed of the plurality of touch sensing units.

8. The touch sensing method according to claim 1, wherein at least one of the first group of the touch sensing units is adjacent to at least one of the second group of the touch sensing units.

9. The touch sensing method according to claim 1, wherein at least one of the first group of the touch sensing units is not adjacent to at least one of the second group of the touch sensing units.

10. The touch sensing method according to claim 1, wherein the amount of the first group of the touch sensing units is a first number, and the amount of the second group of the touch sensing units is a second number, and the second number is equal to the first number.

11. The touch sensing method according to claim 1, wherein the touch reference signal and the touch excitation signal have the same signal waveform.

12. The touch sensing method according to claim 1, wherein the touch reference signal and the touch excitation signal have different signal waveforms.

13. The touch sensing method according to claim 1, wherein the touch reference signal is a direct current signal.

14. The touch sensing method according to claim 1, wherein at least one touch sensing unit is a self-capacitance touch sensing unit,
   wherein the touch excitation signal or the touch reference signal is applied to the touch sensing unit through the touch sensing circuit, and the touch sensing circuit includes a first operational amplifier.

15. The touch sensing method according to claim 1, wherein the touch sensing unit is a mutual-capacitance touch sensing unit,
   wherein the touch excitation signal or the touch reference signal is applied to a first electrode of the touch sensing unit through the touch sensing circuit, and the touch sensing circuit includes a first operational amplifier.

16. The touch sensing method according to claim 1, wherein a plurality of differential sensing signals are obtained from the plurality of first touch sensing signals by a plurality of operation units, or at least one capacitance sensing signal is obtained from the at least one of the plurality of first touch sensing signal and the at least one first reference sensing signal by an operation unit.

17. The touch sensing method according to claim 16, wherein the plurality of operation units include a first operation unit and a second operation unit;
   input signals of the first operation unit and input signals of the second operation unit have one common first touch sensing signal.

18. An electronic device comprising:
   a touch panel;
   a touch sensing apparatus and an operation unit, configured to cooperate with each other to perform the touch sensing method according to claim 1, and a controller, configured to determine a touch position based on the capacitance values of the plurality of touch sensing units.

* * * * *